(12) United States Patent
Linder et al.

(10) Patent No.: US 10,895,868 B2
(45) Date of Patent: Jan. 19, 2021

(54) AUGMENTED INTERFACE AUTHORING

(71) Applicant: Tulip Interfaces, Inc., Somerville, MA (US)

(72) Inventors: Natan Linder, Somerville, MA (US); Rony Kubat, Somerville, MA (US); Roy Shilkrot, Somerville, MA (US); Matt Aldrich, Somerville, MA (US)

(73) Assignee: Tulip Interfaces, Inc., Somerville, MA (US)

( * ) Notice: Subject to any disclaimer, the term of this patent is extended or adjusted under 35 U.S.C. 154(b) by 0 days.

(21) Appl. No.: 15/785,126

(22) Filed: Oct. 16, 2017

(65) Prior Publication Data

US 2018/0113598 A1 Apr. 26, 2018

Related U.S. Application Data

(63) Continuation of application No. PCT/US2016/028014, filed on Apr. 17, 2016.
(Continued)

(51) Int. Cl.
*G06T 19/00* (2011.01)
*G06Q 10/06* (2012.01)
(Continued)

(52) U.S. Cl.
CPC ............ *G05B 19/4184* (2013.01); *B25F 5/00* (2013.01); *G05B 19/408* (2013.01); *G05B 19/4062* (2013.01); *G05B 19/4065* (2013.01); *G05B 19/4186* (2013.01); *G05B 19/41815* (2013.01); *G05B 19/41845* (2013.01); *G06F 3/011* (2013.01); *G06F 3/017* (2013.01);
(Continued)

(58) Field of Classification Search
CPC ...... G06F 3/011; G06F 3/017; G06F 3/04815; G06F 3/0484; G06F 9/453; G06F 8/34; G06T 19/006; G06Q 10/06398; G06K 9/00671; G05B 2219/50185; G05B 2219/32128; G05B 2219/40104
See application file for complete search history.

(56) References Cited

U.S. PATENT DOCUMENTS 5,742,263 A * 4/1998 Wang .................. G02B 27/017 345/7
5,917,460 A * 6/1999 Kodama ............ G02B 27/0093 345/7

(Continued)

FOREIGN PATENT DOCUMENTS

DE 102012005880 A1 11/2012
WO WO 2016/168785 10/2016
WO WO 2016/168786 10/2016

OTHER PUBLICATIONS

Thomas P. Caudell and David W. Mizell, Augmented Reality: An Application of Heads-Up Display Technology to Manual Manufacturing Processes, available at https://ieeexplore.ieee.org/abstract/document/183317/ (Year: 1992).*

(Continued)

*Primary Examiner* — Justin R. Blaufeld

(57) ABSTRACT

Methods, systems, and apparatuses relating to augmented-reality interfaces. Features of the present invention rely on robust touch detection methods, touch detection methods, calibration methods, and integrated projector and sensor apparatuses.

8 Claims, 25 Drawing Sheets

US 10,895,868 B2

Page 2

Related U.S. Application Data

(60) Provisional application No. 62/149,496, filed on Apr. 17, 2015.

(51) Int. Cl.
| | |
|---|---|
| G06K 9/00 | (2006.01) |
| G06F 9/451 | (2018.01) |
| G06F 8/34 | (2018.01) |
| G06F 3/0484 | (2013.01) |
| G06F 3/0481 | (2013.01) |
| H04W 4/38 | (2018.01) |
| G06F 3/01 | (2006.01) |
| G05B 19/418 | (2006.01) |
| G05B 19/408 | (2006.01) |
| G05B 19/4065 | (2006.01) |
| G05B 19/4062 | (2006.01) |
| B25F 5/00 | (2006.01) |
| G06T 7/70 | (2017.01) |
| G06T 7/50 | (2017.01) |
| G06T 7/30 | (2017.01) |
| G06F 3/042 | (2006.01) |
| B23Q 17/00 | (2006.01) |

(52) U.S. Cl.
CPC ........ G06F 3/0484 (2013.01); G06F 3/04815 (2013.01); G06F 8/34 (2013.01); G06F 9/453 (2018.02); G06K 9/00671 (2013.01); G06Q 10/06393 (2013.01); G06Q 10/06398 (2013.01); G06T 19/006 (2013.01); H04W 4/38 (2018.02); B23Q 17/008 (2013.01); G05B 2219/24048 (2013.01); G05B 2219/32128 (2013.01); G05B 2219/40104 (2013.01); G05B 2219/50185 (2013.01); G05B 2219/50203 (2013.01); G06F 3/0425 (2013.01); G06K 9/00355 (2013.01); G06T 7/30 (2017.01); G06T 7/50 (2017.01); G06T 7/70 (2017.01)

(56) References Cited

U.S. PATENT DOCUMENTS

| | | | |
|---|---|---|---|
| 5,960,214 | A | 9/1999 | Sharpe, Jr. et al. |
| 6,198,484 | B1* | 3/2001 | Kameyama ............. G06T 15/10 345/419 |
| 6,388,639 | B1* | 5/2002 | Hoshino ............... H04N 13/368 345/8 |
| 6,684,121 | B1 | 1/2004 | Lu et al. |
| 7,724,278 | B2* | 5/2010 | Maguire, Jr. .......... G06F 3/011 348/121 |
| 7,825,996 | B2* | 11/2010 | Yamada ............. G02B 27/0172 348/744 |
| 8,179,449 | B2* | 5/2012 | Larsson .................. G06F 3/038 348/222.1 |
| 8,290,244 | B2* | 10/2012 | Ha ....................... H04N 13/128 382/154 |
| 8,487,838 | B2* | 7/2013 | Lewis .................. G02B 27/017 345/8 |
| 8,799,810 | B1* | 8/2014 | Wheeler ................. G06F 1/163 715/785 |
| 8,953,889 | B1* | 2/2015 | Worley, III ........... G06F 16/289 382/190 |
| 9,256,988 | B2 | 2/2016 | Wenger et al. |
| 9,367,062 | B2 | 6/2016 | Volpert |
| 9,678,685 | B1 | 6/2017 | Coffing et al. |
| 9,721,386 | B1* | 8/2017 | Worley, III ........... G06F 9/5066 |
| 2002/0120921 | A1 | 8/2002 | Coburn et al. |
| 2002/0122585 | A1* | 9/2002 | Swift ................... H04N 13/359 382/154 |
| 2002/0167462 | A1* | 11/2002 | Lewis ..................... G06F 3/013 345/7 |
| 2003/0234797 | A1* | 12/2003 | Williams ............. G06F 1/1626 345/649 |
| 2004/0128120 | A1 | 7/2004 | Coburn et al. |
| 2005/0125441 | A1 | 6/2005 | Clemens et al. |
| 2005/0172258 | A1 | 8/2005 | Nixon et al. |
| 2005/0177263 | A1 | 8/2005 | Chang et al. |
| 2005/0275636 | A1* | 12/2005 | Dehlin ..................... G09G 5/14 345/173 |
| 2006/0048092 | A1* | 3/2006 | Kirkley, Jr. ............. A63F 13/10 717/100 |
| 2006/0155582 | A1 | 7/2006 | Brown |
| 2006/0288301 | A1 | 12/2006 | Hood et al. |
| 2007/0047040 | A1* | 3/2007 | Ha ....................... H04N 13/144 359/24 |
| 2008/0032601 | A1 | 2/2008 | Arcona et al. |
| 2008/0158757 | A1 | 7/2008 | G.K. et al. |
| 2009/0089682 | A1 | 4/2009 | Baier et al. |
| 2009/0138116 | A1 | 5/2009 | Austin et al. |
| 2009/0189974 | A1* | 7/2009 | Deering ............... G02B 27/017 348/46 |
| 2009/0254843 | A1* | 10/2009 | Van Wie ............. G06F 3/04815 715/757 |
| 2009/0313584 | A1* | 12/2009 | Kerr ........................ G06F 3/012 715/849 |
| 2010/0023156 | A1 | 1/2010 | Trepina et al. |
| 2010/0217612 | A1 | 8/2010 | Apacible et al. |
| 2010/0226535 | A1* | 9/2010 | Kimchi .................. G06F 3/013 382/103 |
| 2011/0032252 | A1* | 2/2011 | Ohta ...................... H04N 13/398 345/419 |
| 2011/0115887 | A1* | 5/2011 | Yoo ....................... H04N 13/398 348/51 |
| 2011/0126142 | A1 | 5/2011 | Zhou et al. |
| 2011/0193939 | A1* | 8/2011 | Vassigh ................. G06F 3/017 348/46 |
| 2011/0205341 | A1* | 8/2011 | Wilson .................... G06F 3/011 348/51 |
| 2011/0231787 | A1 | 9/2011 | Tseo et al. |
| 2011/0242134 | A1* | 10/2011 | Miller ..................... G06F 3/011 345/633 |
| 2011/0267456 | A1* | 11/2011 | Adermann ............. H04N 7/181 348/135 |
| 2012/0013613 | A1* | 1/2012 | Vesely ................... H04N 13/30 345/419 |
| 2012/0086727 | A1* | 4/2012 | Korah ...................... G06F 3/03 345/633 |
| 2012/0194418 | A1* | 8/2012 | Osterhout .......... G02B 27/0149 345/156 |
| 2012/0249741 | A1* | 10/2012 | Maciocci ............. G06T 15/503 348/46 |
| 2012/0256954 | A1* | 10/2012 | Soon-Shiong ........ A63F 13/335 345/633 |
| 2012/0268493 | A1* | 10/2012 | Hayakawa ............. G06F 3/011 345/633 |
| 2012/0287040 | A1* | 11/2012 | Moore .................... A42B 3/042 345/157 |
| 2013/0007672 | A1* | 1/2013 | Taubman ............. G06F 3/0482 715/863 |
| 2013/0027517 | A1* | 1/2013 | Kim ...................... H04N 13/128 348/46 |
| 2013/0104087 | A1* | 4/2013 | Mlyniec ................ G06F 3/0346 715/849 |
| 2013/0106674 | A1* | 5/2013 | Wheeler ............. G02B 27/0176 345/8 |
| 2013/0117707 | A1* | 5/2013 | Wheeler ................. G06F 3/012 715/784 |
| 2013/0139082 | A1* | 5/2013 | Wheeler ................. G06F 3/012 715/765 |
| 2013/0178257 | A1* | 7/2013 | Langseth ............... A63F 13/812 463/4 |
| 2013/0182082 | A1* | 7/2013 | Hayashi ............... H04N 13/218 348/49 |
| 2013/0184847 | A1 | 7/2013 | Fruh et al. |
| 2013/0188021 | A1* | 7/2013 | Sim ....................... H04N 21/816 348/46 |

(56) References Cited

U.S. PATENT DOCUMENTS

| | | | |
|---|---|---|---|
| 2013/0229524 A1* | 9/2013 | Vovkushevsky | G06T 3/4038 348/148 |
| 2013/0237811 A1* | 9/2013 | Mihailescu | A61B 8/4438 600/424 |
| 2013/0241805 A1* | 9/2013 | Gomez | G06F 3/013 345/8 |
| 2013/0246967 A1* | 9/2013 | Wheeler | G02B 27/0093 715/784 |
| 2013/0265218 A1* | 10/2013 | Moscarillo | G06F 3/0416 345/156 |
| 2013/0325155 A1 | 12/2013 | Ryznar et al. | |
| 2013/0328762 A1 | 12/2013 | McCulloch et al. | |
| 2013/0335301 A1* | 12/2013 | Wong | G06F 3/013 345/8 |
| 2013/0343601 A1* | 12/2013 | Jia | G06F 3/011 382/103 |
| 2014/0025834 A1 | 1/2014 | Mergener | |
| 2014/0070924 A1 | 3/2014 | Wenger et al. | |
| 2014/0172148 A1 | 6/2014 | Miller | |
| 2014/0184397 A1 | 7/2014 | Volpert | |
| 2014/0208390 A1 | 7/2014 | Brown et al. | |
| 2014/0279893 A1 | 9/2014 | Branton | |
| 2014/0282282 A1* | 9/2014 | Holz | G06F 3/0304 715/863 |
| 2014/0327628 A1* | 11/2014 | Tijssen | G06F 3/0484 345/173 |
| 2014/0333667 A1* | 11/2014 | Jung | G06T 11/00 345/633 |
| 2014/0354528 A1 | 12/2014 | Laughlin et al. | |
| 2014/0354603 A1 | 12/2014 | Davis et al. | |
| 2015/0040074 A1* | 2/2015 | Hofmann | G06F 3/04815 715/852 |
| 2015/0146007 A1* | 5/2015 | Dusik | G06K 9/6202 348/161 |
| 2015/0268469 A1* | 9/2015 | Marsh | G02B 27/017 345/8 |
| 2016/0253563 A1* | 9/2016 | Lam | H04L 63/08 348/130 |
| 2017/0364234 A1* | 12/2017 | Ligameri | G06F 3/0488 |
| 2018/0107191 A1 | 4/2018 | Kubat et al. | |
| 2018/0107198 A1 | 4/2018 | Linder et al. | |
| 2018/0203437 A1 | 7/2018 | Kubat et al. | |

OTHER PUBLICATIONS

International Search Report and Written Opinion for International Application No. PCT/US2016/28013 dated Jul. 29, 2016.
International Preliminary Report on Patentability for International Application No. PCT/US2016/28013 dated Oct. 26, 2017.
International Search Report and Written Opinion for International Application No. PCT/US2016/28014 dated Sep. 27, 2017.
International Preliminary Report on Patentability for International Application No. PCT/US2016/28014 dated Oct. 26, 2017.
International Search Report and Written Opinion for International Application No. PCT/US2016/28015 dated Aug. 5, 2016.
International Preliminary Report on Patentability for International Application No. PCT/US2016/28015 dated Oct. 26, 2017.
International Search Report and Written Opinion for International Application No. PCT/US2016/28016 dated Jan. 24, 2017.
International Preliminary Report on Patentability for International Application No. PCT/US2016/28016 dated Oct. 26, 2017.
[No Author Listed], Human Machine Interface (HMI) Guide. Texas Instruments. Industrial Automation Solutions. 2014. 9 pages.
Asato et al., "Analysis of open CNC architecture for machine tools," Journal of the Brazilian Society of Mechanical Sciences. 2002;24(3)5.
Chen et al., "Code-Centric RFID System Based on Software Agent Intelligence," IEEE Intelligent Systems. 2010. 13 pages.
Hebert, "How to link machine controls to IT systems," Control Design. 2015. https://www.controldesign.com/articles/2015/how-to-link-machine-controls-to-it-systems/?show=all Jun. 8, 2015. Last accessed Oct. 26, 2017. 4 pages.
Extended European Search Report dated Nov. 19, 2018 in connection with European Application No. 16780970.6.
Extended European Search Report dated Nov. 20, 2018 in connection with European Application No. 16780971.4.
Extended European Search Report for European Application No. 16780969.8 dated Feb. 18, 2019.
Extended European Search Report for European Application No. 16780972.2 dated Jun. 26, 2019.
Ellingwood, "The Docker Ecosystem: An Overview of Containerization." The Docker Ecosystem. https://digitalocean.com/community/tutorials/the-docker-ecosystem-an-overview-of-containerization. 2015. 10 pages.
International Preliminary Report on Patentability dated Oct. 17, 2017 From the International Searching Authority Re. Application No. PCT/US2016/028013. (10 Pages).
International Search Report and the Written Opinion dated Aug. 5, 2016 From the International Searching Authority Re. Application No. PCT/US2016/028013. (12 Pages).
Official Action dated Jun. 8, 2020 from the U.S. Patent and Trademark Office Re. U.S. Appl. No. 15/566,890. (27 pages).
International Preliminary Report on Patentability dated Oct. 17, 2017 From the International Bureau of WIPO Re. Application No. PCT/US2016/028014. (9 Pages).
International Search Report and the Written Opinion dated Sep. 27, 2016 From the International Searching Authority Re. Application No. PCT/US2016/028014. (15 Pages).
Communication Pursuant to Article 94(3) EPC dated Jun. 9, 2020 From the European Patent Office Re. Application No. 16780969.8. (11 Pages).
Interview Summary dated Aug. 27, 2020 from the U.S. Patent and Trademark Office Re. U.S. Appl. No. 15/566,890. (3 pages).

* cited by examiner

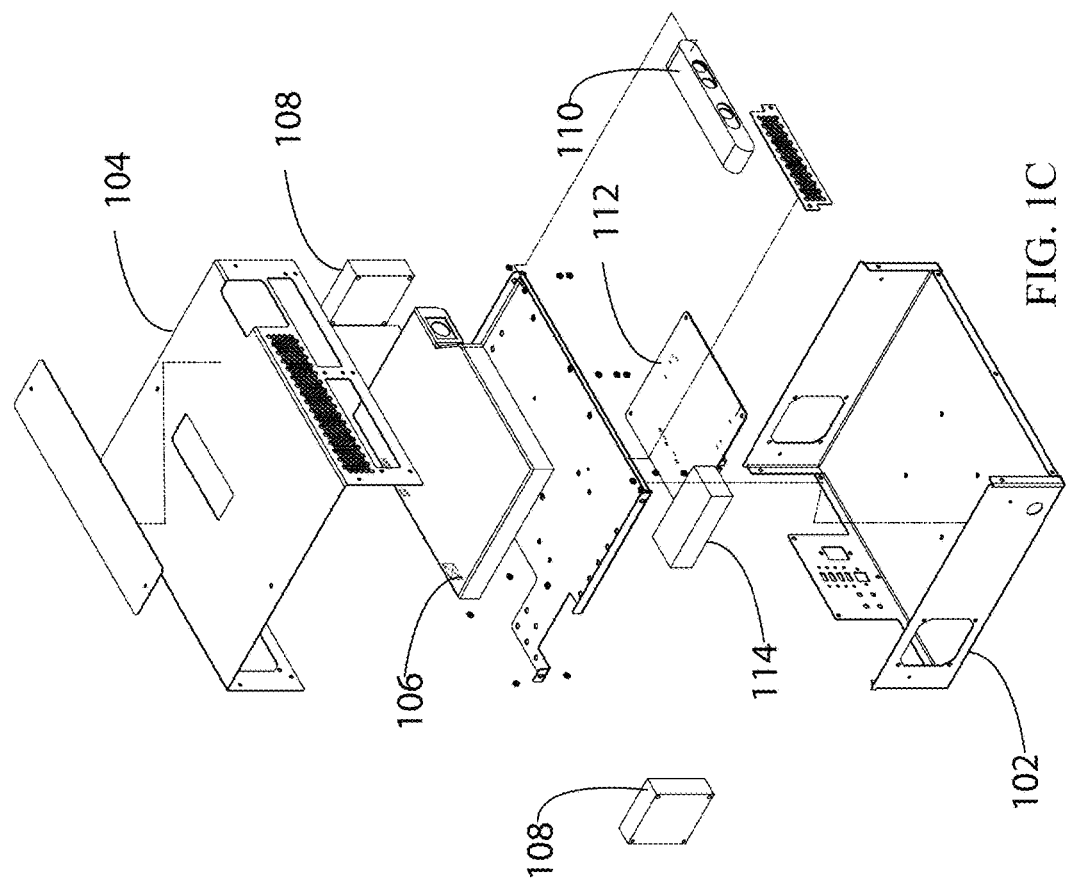
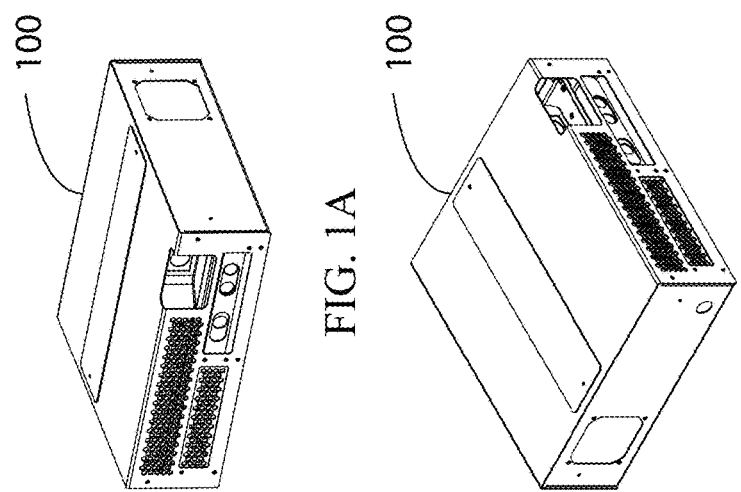
FIG. 1
FIG. 1A
FIG. 1B
FIG. 1C

US 10,895,868 B2

AUGMENTED INTERFACE AUTHORING

CROSS REFERENCE TO RELATED APPLICATIONS

This application is a continuation claiming the benefit under 35 U.S.C. § 120 of International Application No. PCT/US2016/028014, filed on Apr. 17, 2016, which claims priority to U.S. Provisional Application No. 62/149,496, filed on Apr. 17, 2015. Each of these applications is incorporated herein by reference in its entirety.

FIELD

This disclosure relates to methods, apparatuses, and systems for authoring augmented reality interfaces, including embodiments utilizing touch detection and calibration methods, as well as integrated projector and sensor apparatuses.

BACKGROUND

Certain facilities have implemented lighting techniques to assist operators in performing some process by, e.g., using light to instruct a user such as an operator. These facilities may use projection devices to project light on certain objects or in certain areas within the facility, for example. Additionally, some facilities have implemented sensor devices to gather information regarding a user and their work habits.

Often times these light projectors and/or sensor devices are not properly calibrated (e.g., with each other) and must manually be calibrated before use. For example, there are no viable, commercial off-the-shelf (COTS) projection and sensor systems that are packaged and readily calibrated with each other that can gather information regarding operators and their surrounding environment upon deployment.

Additionally, there are no readily available methods for creating interfaces via interactive surfaces that can, for example, receive input from an operator and display information regarding the workspace on the interactive surface. Existing human-machine interfaces (HMIs) are inflexible in both physical (i.e., the location of buttons, meters, etc.) and virtual domains (i.e., computer displays of machine interfaces). The focus of existing HMIs is still the facilitation of machine automation and control by a human operator. However, these existing HMIs do not provide interfaces for operators that guide, assist, or measure the human aspect when operators are performing some process.

A need exists, therefore, for methods, apparatuses, and systems that overcome these and other disadvantages.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for authoring an augmented-reality interface in a workspace.

The method includes providing a projection device for projecting imagery in the workspace; providing at least one sensor device for gathering information regarding the workspace; detecting at least one interaction event between at least one operator and the workspace via the at least one sensor device; and projecting, via the projection device, imagery based on the at least one detected interaction event, wherein the projected imagery relates to a procedure to be performed in the workspace.

In one embodiment, the at least one sensor device is selected from the group consisting of a depth sensor, intensity sensor, stereoscopic sensor, a thermal sensor, and an infrared sensor.

In one embodiment, the at least one interaction event includes at least one of a gesture made by the at least one operator and a touch event between the at least one operator and the workspace.

In one embodiment, the method further includes providing an interactive surface for receiving input from the at least one operator; displaying the information regarding the workspace on the interactive surface; receiving input from the at least one operator at the interactive surface; and projecting, via the projection device, imagery based on the received input, wherein the projected imagery relates to a procedure to be performed in the workspace.

In one embodiment, providing at least one sensor device comprises providing two sensor devices, the first sensor device oriented toward the at least one operator and the second sensor device oriented toward the area of the workspace receiving the projected imagery.

In one embodiment, the imagery is projected on an intermittent basis, and the at least one sensor device gathers information regarding the workspace when the imagery is not projected.

In one embodiment, the method further includes communicating information regarding the at least one interaction event to a network-connected storage.

In one embodiment, a network-connected storage stores information related to at least one object in the workspace.

In one embodiment, the method further includes communicating at least one initial candidate for object detection in the environment from the network-connected storage to a local storage for detection.

In another aspect, embodiments relate to an integrated projector and sensor system. The system includes an operator sensing device oriented to detect at least one operator at a workspace; at least one secondary sensor device, wherein the at least one secondary sensor device is oriented to detect the at least one operator's movement in the workspace; and a projection device for projecting imagery in the workspace, wherein the imagery projected is based on the at least one operator's movement in the workspace detected by the at least one secondary sensor device.

In one embodiment, wherein the at least one secondary sensor device includes a plurality of secondary sensor devices that are configured to detect at least one interaction event between the at least one operator and the workspace.

In one embodiment, the system further includes a processing unit configured to predict at least one interaction event between the at least one operator and the workspace or at least one interaction event between two operators based on data collected from at least one of the operating sensing device and the at least one secondary sensor device. In one embodiment, the projection device is configured to project imagery in the workspace based on the at least one predicted interaction event.

In one embodiment, the operator sensing device is configured to detect when the operator is approaching the workspace. In one embodiment, the projection device is configured to project imagery in the workspace when the operator is approaching the workspace. These features facilitate a predictive user interface that responds to an operator being detected and, therefore, can assist the operator(s) in a variety of ways.

In one embodiment, the system further includes a housing unit for housing the projection device and the at least one secondary sensor device. This housing unit may facilitate calibration between the projection device and the sensor device(s) so that the components can function immediately upon deployment.

In yet another aspect, embodiments relate to a method for gesture detection between at least one operator and a workspace. The method includes capturing at least one image of the workspace; generating at least one touch-detection model corresponding to at least one surface in the workspace; and recognizing, via at least one sensor device, at least one instance of contact between a portion of the at least one operator and the at least one surface of the workspace based on at least one of threshold crossing, touch-history based prediction, and model driven methods. These features enable, among other features, a robust mechanism that supports a multi-touch sensor based on a "top-of-hands" view that supports common sets of multi-touch gestures. Additionally, this technique, coupled with a calibrated system, may be used to implement a novel, multi-touch interface system.

In one embodiment, the method further includes defining a first threshold layer adjacent to the at least one touch-detection model. In one embodiment, recognizing the at least one instance of contact includes detecting when the portion of the at least one operator is within the first threshold layer adjacent to the touch-detection model. In one embodiment, the method further includes defining at least a second threshold layer adjacent to the first threshold layer. In one embodiment, recognizing the at least one instance of contact includes detecting when the portion of the operator crosses from the first threshold layer to the second threshold layer.

In one embodiment, the portion of the at least one operator includes at least one of the at least one operator's fingers, hands, arms, torso, and head.

In one embodiment, the method further includes applying a classifier to distinguish between the portion of the at least one operator and at least one other object in the workspace. In one embodiment, the method further includes recognizing, via at least one sensor device, movement of a portion of the at least one operator and on at least one of threshold crossing, touch-history based prediction, and model driven methods. In one embodiment, the method further includes recognizing, via at least one of the recognized contact and recognized movement, a pre-defined gesture. The gesture may be selected from the group consisting of enter authoring mode, scale up, scale down, rotate, translate, point touch, double touch, scrolling, three-finger touch, move to next step, move to previous step, show menu, zoom in, and zoom out. In one embodiment, the method further includes recognizing, via at least one of the recognized contact and recognized movement, an undefined gesture and storing the undefined gesture for future recognition.

In yet another aspect, embodiments relate to a calibration method. The method includes projecting, via a projection device, imagery in a first environment, wherein the projected imagery includes a plurality of projection pixels that are each assigned a first unique signature; capturing, via the at least one sensor device, at least one image of the imagery projected by the projection device in the first environment, wherein the at least one image includes a plurality of sensor pixels that are each assigned a second unique signature; and calibrating the projection device and the sensor device by correlating a plurality of the first unique signatures with a plurality of second unique signatures.

In one embodiment, the method further includes calculating a certainty mask relating to a detection rate of the sensor device, wherein the certainty mask is based on at least one of ambient lighting conditions, focal setting of the sensor device, frame rate of the sensor device, exposure setting of the sensor device, frame rate of the projection device, and power supply harmonics; and adjusting at least one operational parameter of at least one of the projection device and the sensor device based on the calculated certainty mask.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. Non-limiting and non-exhaustive embodiments are described with reference to the following figures in which:

FIG. 1 illustrates multiple views of a projector and sensor apparatus in accordance with one embodiment;

In the drawings, like reference characters generally refer to corresponding parts throughout the different views. The drawings are not necessarily to scale, emphasis instead being placed on the principles and concepts of operation.

DETAILED DESCRIPTION

Figure 2:
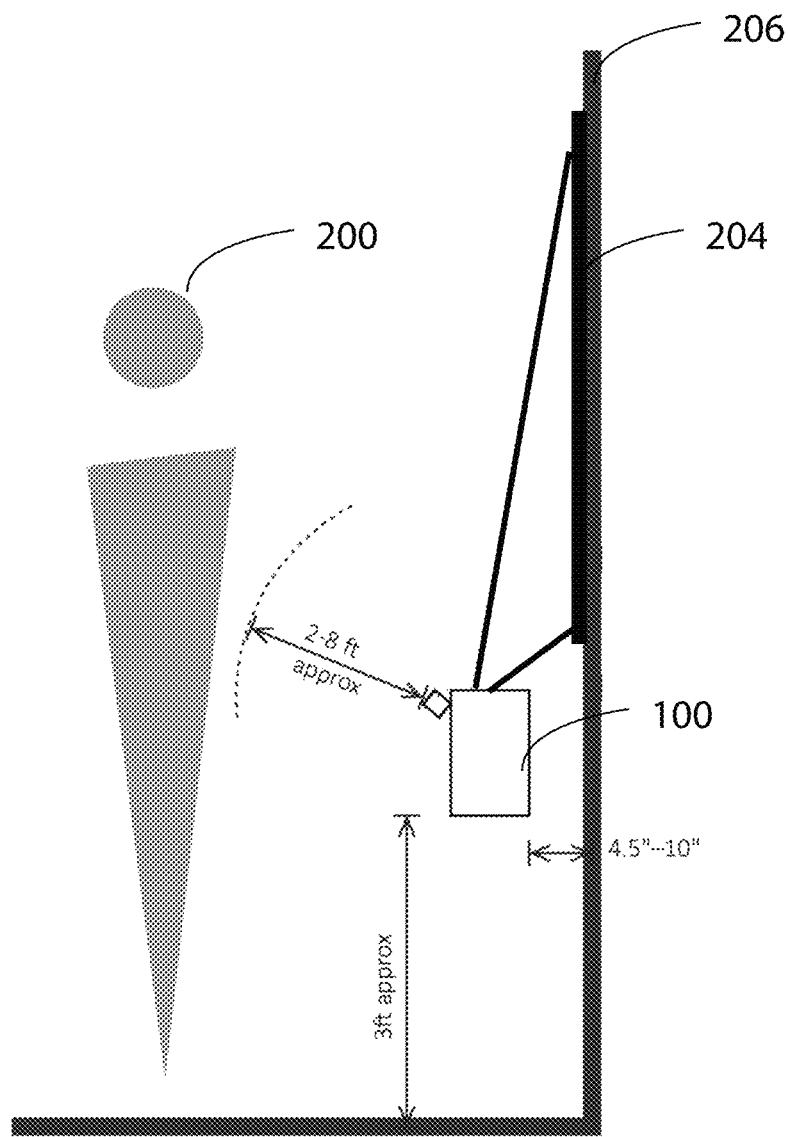
FIG. 2 illustrates an operator interacting with the projector and sensor apparatus 100 of FIG. 1 in accordance with one embodiment.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions that could be embodied in software, firmware or hardware, and when embodied in software, could be downloaded to reside on and be operated from different platforms used by a variety of operating systems.

The language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Features of the present invention enable, among other features, the direct and indirect authoring of augmented reality interfaces. An operator may make certain gestures in a workspace to design, via augmented reality, interfaces used to implement or otherwise carry out certain processes. For example, an operator may, while in the workspace, make a gesture with their hand/fingers. This gesture may be interpreted as creating a text window (projected by the projection device), buttons, or other types of indicia used to assist an operator in performing a procedure in the workspace.

The direct and indirect authoring of augmented reality interfaces is enabled by several related procedures and other novel features. These include, methods for calibrating the sensor device(s) and projection device, methods for optimizing internal settings of said components, methods for synchronizing said components with on-or-off premise servers, methods for detecting touch events, as well as a novel form-factor and packaging configuration. This configuration enables, among other features, a system that is easy to install, quick to set up, and does not require knowledge of the workspace environment.

In the context of the present application, the terms "operator" and "user" may be used interchangeably. These terms may refer to a person within a facility who designs and/or performs some procedure. The term "operator" may also refer to a person who authors interfaces by implementing the various features and methods described herein. Moreover, the term "operator" may refer to a single operator or multiple operators. The term "procedure" may relate to a task or process to be performed in the workspace, as well as applications related to gaming, video, messaging, music, communications, or the like.

Features of the present invention may be implemented in a variety of applications. Applications such as those in manufacturing, farming, transportation, construction, surveillance, education, logistics, counter-terrorism and other defense applications, and retail, for example, may benefit from the features of the invention.

FIGS. 1A and 1B depict multiple views of a projector-sensor apparatus 100 in accordance with one embodiment of the invention. FIG. 1C depicts an exploded view of the apparatus 100 in accordance with one embodiment. As shown, the apparatus 100 may include a base portion 102, a top portion 104, a projection device 106, fans 108, at least one sensor device 110, a processing unit 112, and a power supply 114.

The projection device 106 may be a digital light processing device (DLP), a laser device(s), and/or liquid crystal on silicon (LCOS) device(s), for example. The projection device 106 may project imagery onto a wall, table, floor, or other type of surface. The projected imagery may be, for example, light patterns representative of buttons that can be activated by an operator, arrows representing directions for an operator or indicators to direct an operator's attention, text representing instructions for an operator, and indicia inputted by an operator.

The fans 108 may serve to provide passive or active cooling to at least assist in maintaining a certain temperature of the components of the apparatus 100.

The at least one sensor device 110 may include one or more sensor devices that measure position and/or motion in two dimensions and/or three dimensions. These may include imaging sensors such as depth sensors, stereoscopic sensors, charge-coupled device sensors, complementary metal-oxide-semiconductor (CMOS) sensors, intensity sensors, thermal sensors, infrared sensors, other types of cameras, or the like. This list is non-exhaustive and other types of sensor devices, whether available now or invented hereafter, may be used as long as they can accomplish the various features of the invention. In addition to any sensor devices 110 within the apparatus, there may several other sensor devices located at various positions about a workspace and oriented to gather information regarding an operator.

The processing unit 112 may be any specifically configured processor or hardware device capable of calibrating the projection device 106 and the at least one sensor device 110, analyzing information gathered by the at least one sensor device 110, and instructing the projection device 106 accordingly. The processing unit 112 may include a microprocessor, a field programmable gate array (FPGA), application-specific integrated circuit (ASIC), or other similar device. In some embodiments, such as those relying on one or more ASICs, the functionality described as being provided in part via software may instead be hardwired into the operation of the ASICs, and as such, any associated software may be omitted.

The power supply 114 may be any type of power supply as long as it can provide power to the various components of the projector-sensor apparatus 100.

FIG. 2 presents one embodiment in which an operator 200 is in the vicinity of the projector-sensor apparatus 100. In this embodiment, the projector-sensor apparatus 100 may project imagery 204 onto a surface such as a wall 206. The projected imagery 204 may include various passive (i.e., informational) elements, such as textual instructions, drawings, schematics, figures, and active (i.e., user interface) elements, such as buttons, scroll bars, dialog boxes, virtual keyboards, etc. The projected imagery 204 may be used to instruct the operator 200 while performing a particular process, and to elicit feedback from the operator 200 in the performance of that process in connection with the provision of further instructions or for later study and review, as discussed in greater detail below.

Referring back to FIG. 1, the projection device 106 and any applicable sensor devices 110 should be appropriately calibrated with each other in order to accomplish the various features of the invention. There are generally two calibration stages: (1) calibration during assembly of the apparatus (factory calibration); and (2) calibration at deployment.

Figure 3:
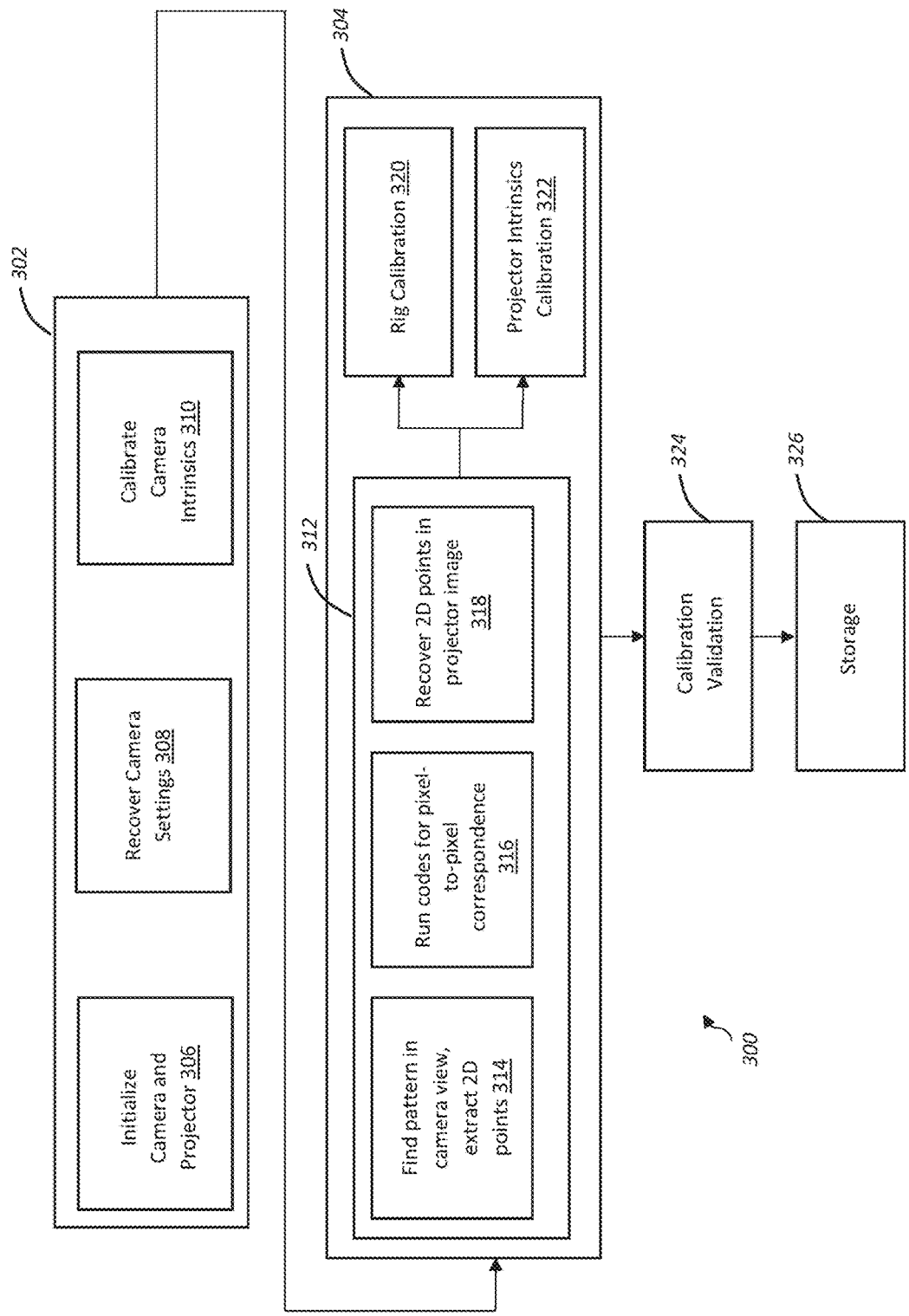
FIG. 3 depicts a flowchart of a method of factory calibration in accordance with one embodiment.

FIG. 3 depicts a flowchart of a method 300 for factory calibration in accordance with one embodiment. Factory calibration refers to calibration based on the distances, arrangements, and orientations of the components that are packaged in the apparatus 100. These devices are calibrated under the assumption that these parameters will generally not change after assembly.

Factory calibration is divided into two main steps: initialization 302 and calibration 304. Step 306 involves initializing the camera and the projection device. This step may involve enabling the auto-focus and exposure of the camera, and may involve turning the projection device to its lowest setting (e.g., lowest level of brightness). There may be ambient light (which may be very bright), in which case the projection device may need to be even brighter in order for the camera to detect the projected imagery (e.g., in order to avoid the "rolling shutter effect" or other such temporal aliasing effects).

Figure 4:
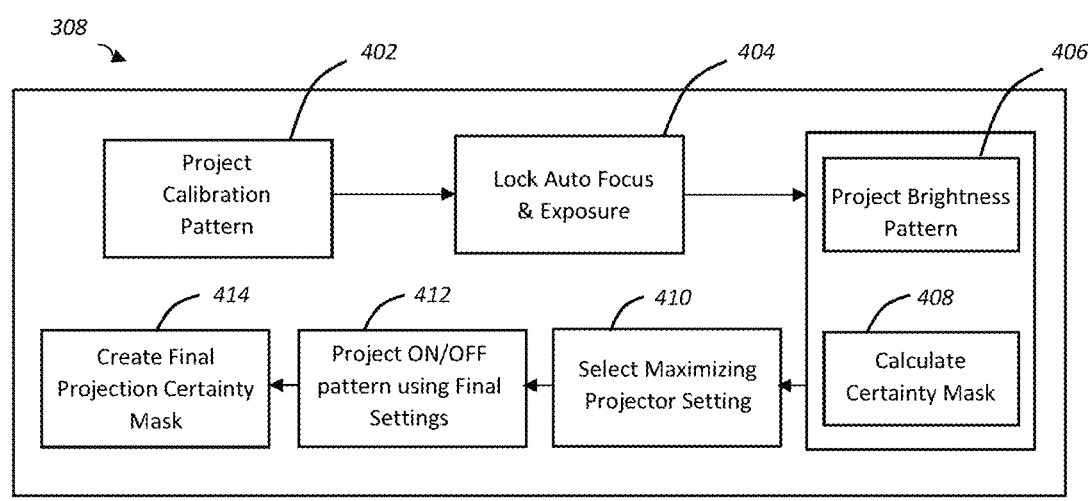
FIG. 4 depicts a flowchart of the camera recovery setting step of FIG. 3 in accordance with one embodiment.

Step 308 involves recovering camera settings and is illustrated in more detail in FIG. 4. Step 402 involves projecting a calibration pattern to find a balance between the camera exposure setting and projection brightness based on, for example, current ambient lighting conditions. This may be an iterative process to find the best balance between the projection device and the camera(s).

For example, the projection device may project a pattern in which half of the projection device pixels are on and half are off. This may serve as a baseline, and camera may be configured to automatically find the appropriate exposure based on the projected pattern. This process may be repeated a number of times with different patterns (e.g., ranging from darker projection patterns to brighter projection patterns). Once the appropriate exposure is found, the auto exposure and focus may be locked in step 404.

Step 406 involves projecting a brightness pattern to find the most optimal projection values of the projection device (i.e., the projection value that will provide the best certainty in terms of which pixels are on or off as detected by the camera). This may be an iterative process starting from darker values of the projection device to brighter values to calculate a certainty mask in step 408. The certainty mask of step 408 is essentially a score that refers to which pixels of the scene gathered by the camera are projection device pixels (and not, e.g., pixels that are bright due to external lights or because of reflective surfaces). Steps 406 and 408 may be repeated a number of times.

Regarding steps 402-406, the maximizing projection parameter p, essentially the brightness of the projected patterns, may be determined using the following:

$$\hat{p} = \underset{p \in [0,255]}{\arg\max} f(p, c|l)$$

where l are the given lighting conditions in the scene. Then, the scoring function may be written as:

$$f(p, c|l) = \sum_{x \in I} g(x)$$

where x is a pixel location in image I and $$g(x) = \begin{cases} 1 & \text{if } I_c(x, p|c) = 1 \\ 0 & \text{else} \end{cases}$$

and $I_c(x, p|c)$ is the certainty image mask, which is calculated when the camera is set up to use the exposure value c and the projection device uses projection value p. The mask may be defined as follows:

$$I_{\tilde{c}}(x, p|c) = \begin{cases} 1 & \text{if } \lambda(I_{ON}(x, p) - I_{OFF}(x)) > \tau \\ 0 & \text{else} \end{cases}$$

$$I_c = \otimes I_{\tilde{c}}$$

where $\otimes$ is the "Open" operator, $\lambda$ is the projection normalization coefficient, $\tau$ is the threshold, and $\kappa$ is the gain. $I_{ON}$ and $I_{OFF}$ are the camera images when the projection pattern is turn on and off, respectively.

Step 410 involves selecting a maximizing projection device setting, and step 412 involves projecting an on/off projection pattern (i.e., which some pixels are on and others are off). Based this projection and these settings, a final projection certainty mask is created in step 414.

Referring back to FIG. 3, step 310 involves calibrating camera intrinsics. These intrinsics may include parameters related to the center of projection, distortion, and other focal length-related parameters that may be obtained by capturing images of known objects, for example.

After initialization, method 300 proceeds to step 304 for calibration. Step 304 includes the step 312 of finding 2D-2D point correspondence between the projection device and camera which may be performed a number of times. Step 312 includes finding a pattern in the camera view and extracting 2D points 314, running codes for pixel-to-pixel correspondence 316, and recovering 2D points in the projected image 318.

Figure 5:
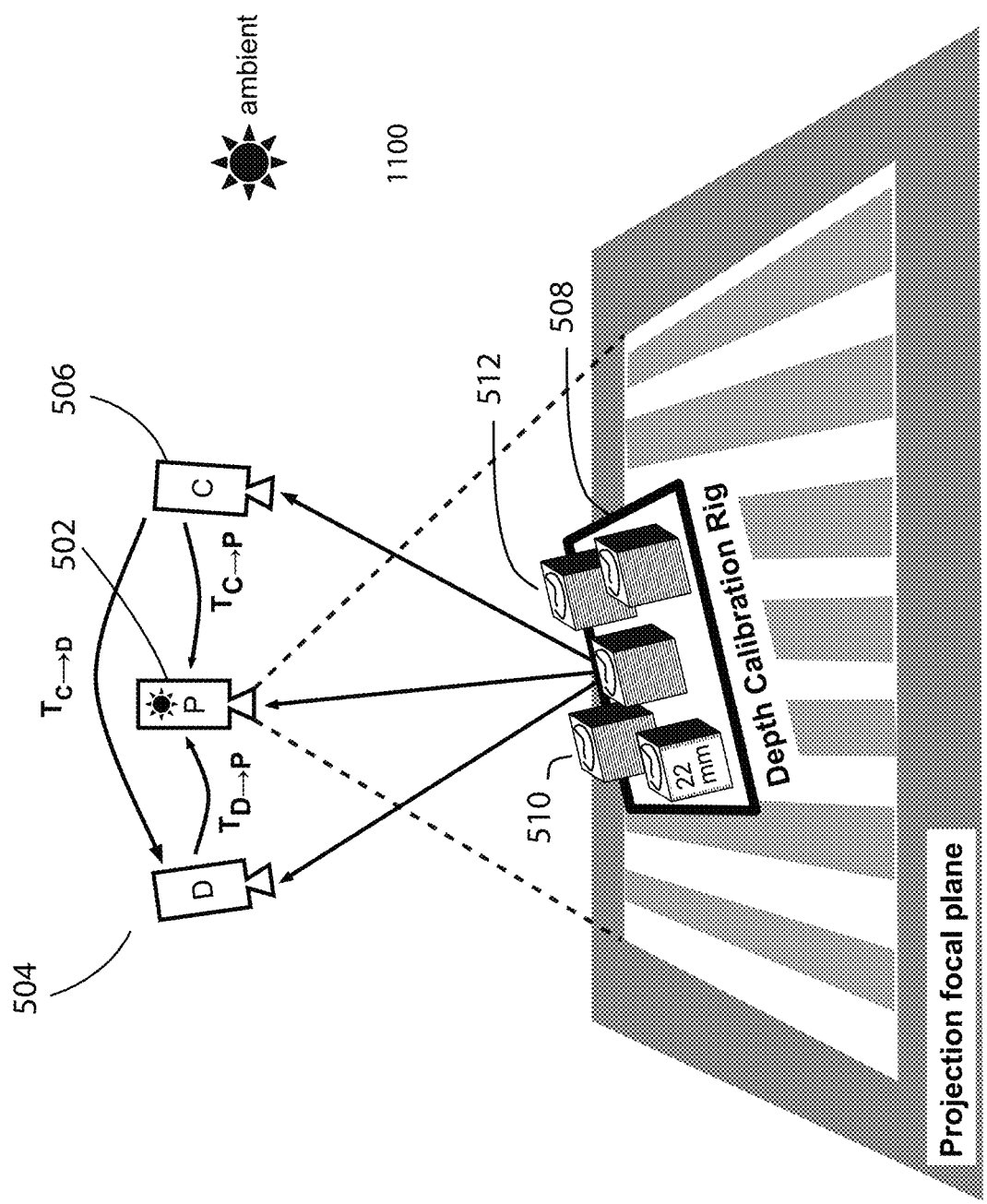
FIG. 5 illustrates various components performing the calibration method of FIG. 3 in accordance with one embodiment.

FIG. 5 illustrates the components of the apparatus 100 (housing not shown) while performing various sub-steps of step 304 of FIG. 3. As shown, these components may include a projection device 502, a depth sensor 504, and a camera 506. In order for these devices to be properly calibrated, the transformation T between the various components must be obtained.

The depth sensor 504 does not detect projection patterns but instead senses depth. Therefore, the transformation $T_{C \rightarrow P}$ between the camera 506 and the projection device 502 and the transformation $T_{C \rightarrow D}$ between the camera 506 and the depth sensor 504 must first be determined. From these two transformations, the transformation $T_{D \rightarrow P}$ between the depth sensor 504 and the projection device 502 can be determined. The depth calibration rig 508 may assist in the calibration and may include a plurality of calibration cubes 510 with fiducial markers 512.

First, the projection device 502 may project a pattern in to be detected by the camera 506 in step 314. With knowledge of the imagery that the projection device is projecting, the camera 506 may then detect and extract points within the projected pattern.

Each pixel of the projection device and each pixel of the camera is assigned a sequence (e.g., a binary sequence (01101 . . . )) that is ran in step 316 to correlate pixels between the projection device and the sensor device. Then, in step 318, points in the projected imagery are recovered. Steps 314, 316, and 318 may repeated N times until the projection device and sensor device(s) are properly correlated.

Step 320 involves rig calibration. The depth sensor 504 may detect the depths of the calibration cubes 510, and the camera 506 may detect the fiducial markers 512. An operator may make a series of movements of the calibration rig 508 (e.g., by rotating, raising, lowering, tilting, etc.) so the camera 506 and the depth sensor 504 can gather a plurality of measurements regarding the positions of certain calibration cubes 510 and certain fiducial markers 512. From these measurements, the apparatus may find 2D-2D correspondence between the depth sensor 504 and the camera 506.

Step 322 involves calibrating projection device intrinsics. Similar to intrinsics of the camera, these intrinsics may include parameters related to center of projection, distortion, and other focal length-related parameters.

Figure 6:
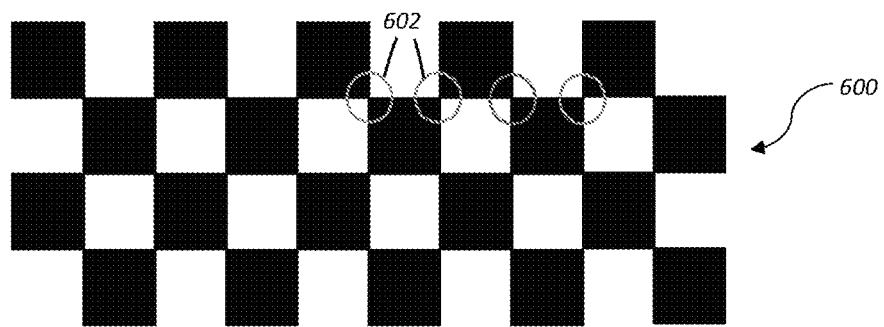
FIG. 6 depicts an exemplary calibration validation pattern used in the method of FIG. 3 in accordance with one embodiment.

Step 324 involves iterative calibration refinement. In this step, the projection device 502 may project a known pattern 600 such as the one illustrated in FIG. 6. If the devices are properly calibrated, the camera 506 should be able to accurately identify specific portions of the projected pattern 600, for example. Finally, information regarding the calibrations such as the transformations may be stored in step 326 for later retrieval.

Figure 7:
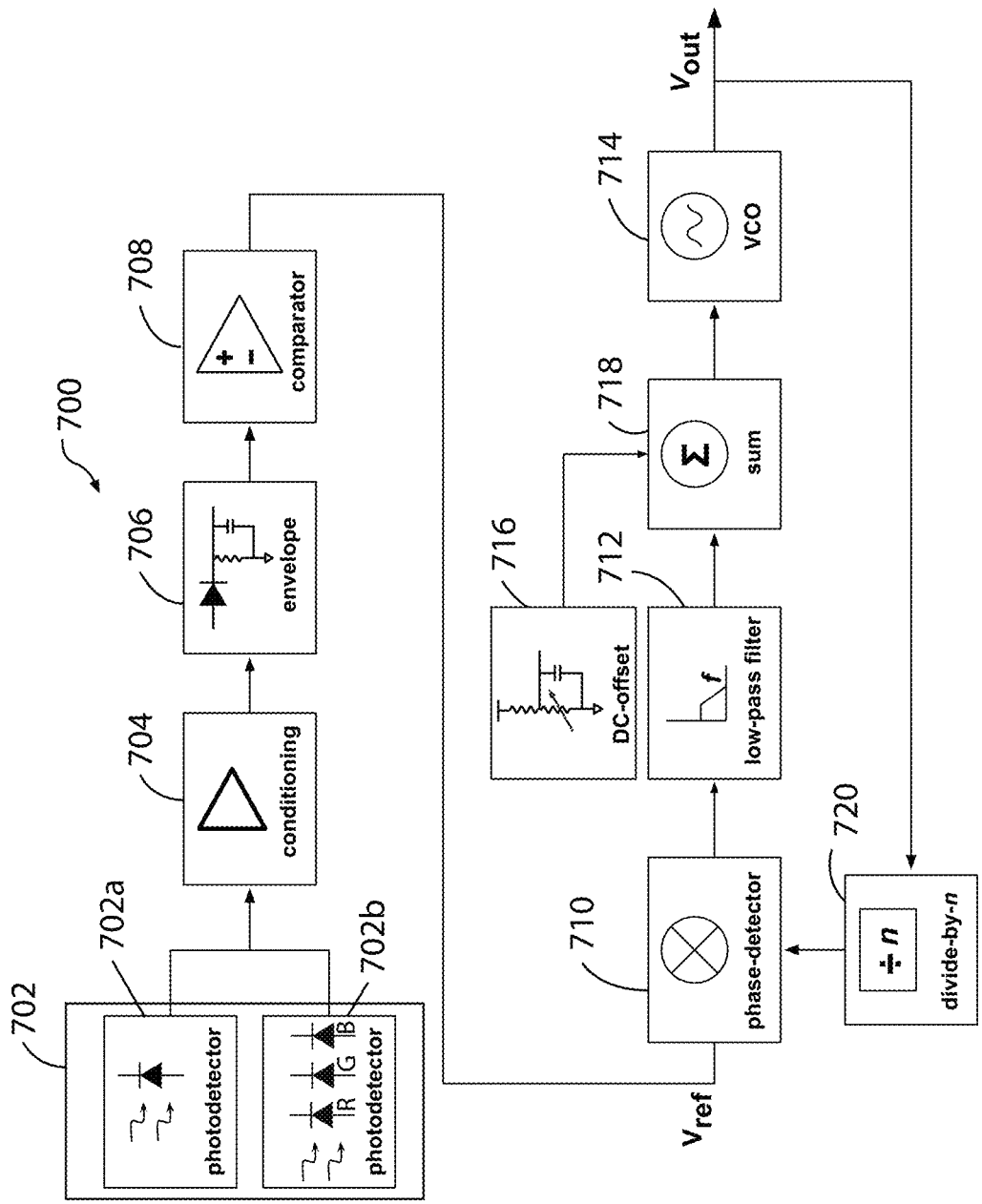
FIG. 7 depicts a synchronization process in accordance with one embodiment.
Figure 8:
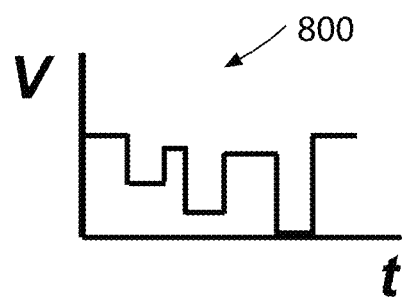
FIG. 8 illustrates voltage as a function of time during the synchronization process of FIG. 7 in accordance with one embodiment.

In order to more efficiently perform steps detecting projected imagery, features of the present invention may perform various synchronization methods of the camera and projection device. FIG. 7 depicts a flowchart outlining steps of a synchronization process 700 in accordance with one embodiment. This hardware calibration allows for a quick and inexpensive integration with commercial-off-the-shelf (COTS) projection devices without requiring deep electronics integration to receive the projection device sync signals. Therefore, this enables flexibility and saves on costs, while simplifying the system so that COTS components can be used and interchanged (i.e., namely, a motherboard, a projection device, and sensor can quickly be integrated together). In step 702, a single photodiode 702a or a combination of photodiodes 702b with red, green, and blue (RGB) filters may measure the illuminance on a plane incidental to the projection device 106. The current measured by the photodiode 702a or photodiodes 702b may then be conditioned by a transimpedance amplifier in step 704 and converted into voltage. Therefore, voltage can be measured as a function of time as seen in graph 800 of FIG. 8.

The voltage may then be passed into a peak detector (e.g., an envelope generator) in step 706, at which point it charges the capacitor. When the diode(s) is back biased, the peak detector essentially holds the voltage via the charged capacitor. The decay time constant (given by Resistance×Capacitance) may be, in some embodiments, chosen manually or automatically with some additional circuitry.

The smooth envelope of the peak detector from step 706 is then passed into a comparator in step 708. The comparator may provide a binary output (high/low) depending on whether the voltage envelope is greater than or less than a threshold voltage at the other input of the voltage comparator. This threshold voltage, in conjunction with the decay time constant (R*C) may be set depending on the frame rate, sub-frames within the primary frame rate, or other characteristics of the projection device. For example, the threshold voltage and R*C constant may be specified such that the output of the comparator in step 708 is "high" when the projection device's RGB illumination is "off."

Figure 9:
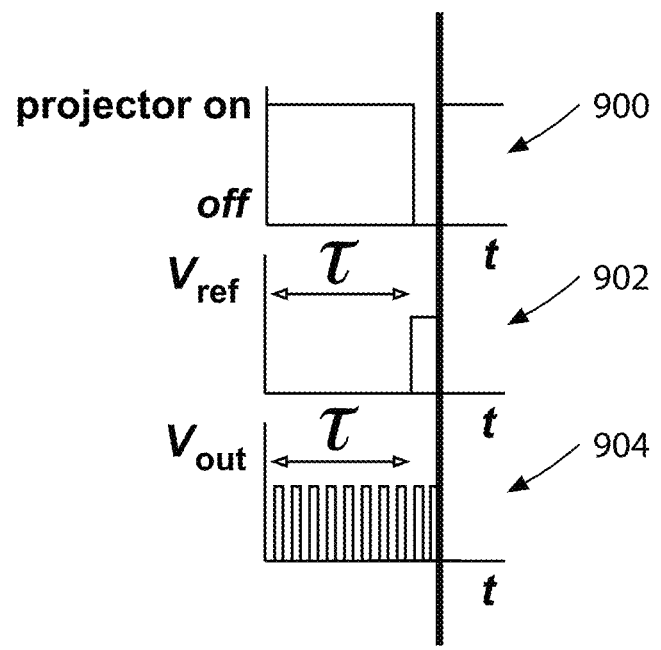
FIG. 9 illustrates projector state and voltage as a function of time during the synchronization process in accordance with one embodiment.

The output of the comparator in step 708 may form a reference signal $V_{Ref}$ in a phase-locked-loop (PLL). In step 710, a phase detector may compare the phase of the reference signal $V_{Ref}$ with a signal generated by a local oscillator. The phase difference between the reference signal $V_{Ref}$ and the local oscillator signal is low-pass filtered in step 712 and used to create a feedback loop with a voltage-controlled oscillator (VCO) in step 714. If needed, in step 716 a DC-offset can be added to the low-pass phase difference, which is summed in step 718, to adjust the phase of the VCO output. The output may be fed through a divider in step 720 in order to make the output frequency a multiple of the reference frequency. FIG. 9 depicts graphs 900, 902, and 904 of the projection device state, $V_{ref}$, and $V_{out}$, respectively, as a function of time.

The output frequency of the VCO is proportional to the phase difference between $V_{Ref}$ and the post-scalar VCO output. That is, the post-scalar allows the VCO to function as a frequency multiplier. The VCO output tracks the phase of the projection device 106 and may be used to trigger a sensor device 110 (e.g., a global shutter camera with an external sync pin) to take a picture when the projection device 106 is "off."

In some embodiments, if the RGB diodes in the projection device 106 are modulated out of phase (or fully orthogonal), then the output $V_{out}$ of the VCO $V_{out}$ can be phase shifted (e.g., using an R-C based filter). This modification may be useful to, for example, capture an image of a scene under illumination of a single wavelength.

Figure 10:
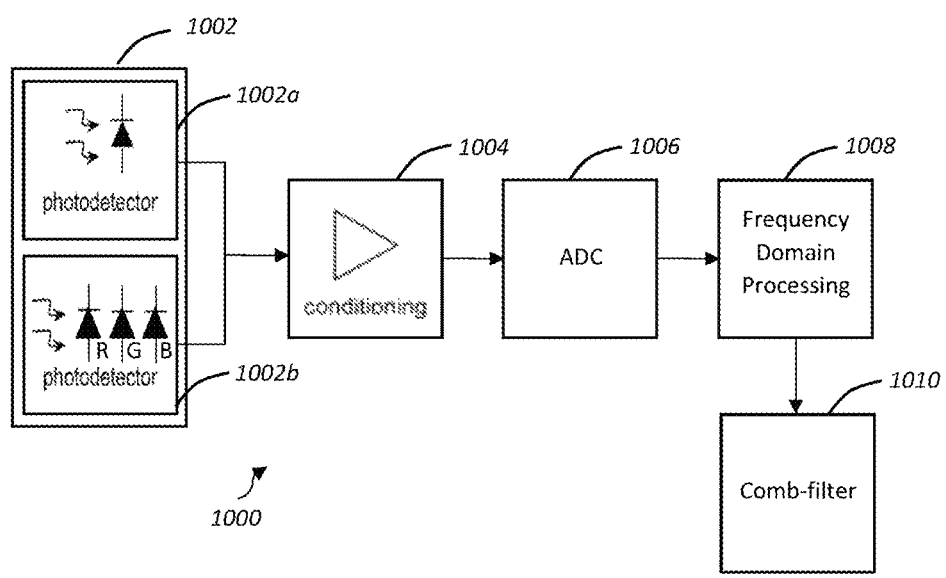
FIG. 10 depicts a flowchart of a synchronization process in accordance with another embodiment.

FIG. 7 depicts an analog-based method 700 for synchronization. A digital-based approach is also possible and is depicted as method 1000 in FIG. 10. In step 1002, a single photodiode 1002a or a combination of photodiodes 1002b with red, green, and blue (RGB) filters measure the illuminance on a plane incidental to the projection device 106. The current measured by the photodiode 1002a or photodiodes 1002b may then be conditioned by a transimpedance amplifier in step 1004 and converted into voltage.

After the sensor conditioning in step 1004, an analog-to-digital converter may sample the sensor circuitry in step 1006. A variety of techniques, namely, signal processing in the frequency domain (e.g., z-transform) can be used in step 1008 and a comb filter can be used in step 1010 to obtain the frame rate of the projection device. Similarly, this timing information may be used by the processing unit 112 or other type of embedded controller to control the sync-pin on the sensor device(s).

Figure 11:
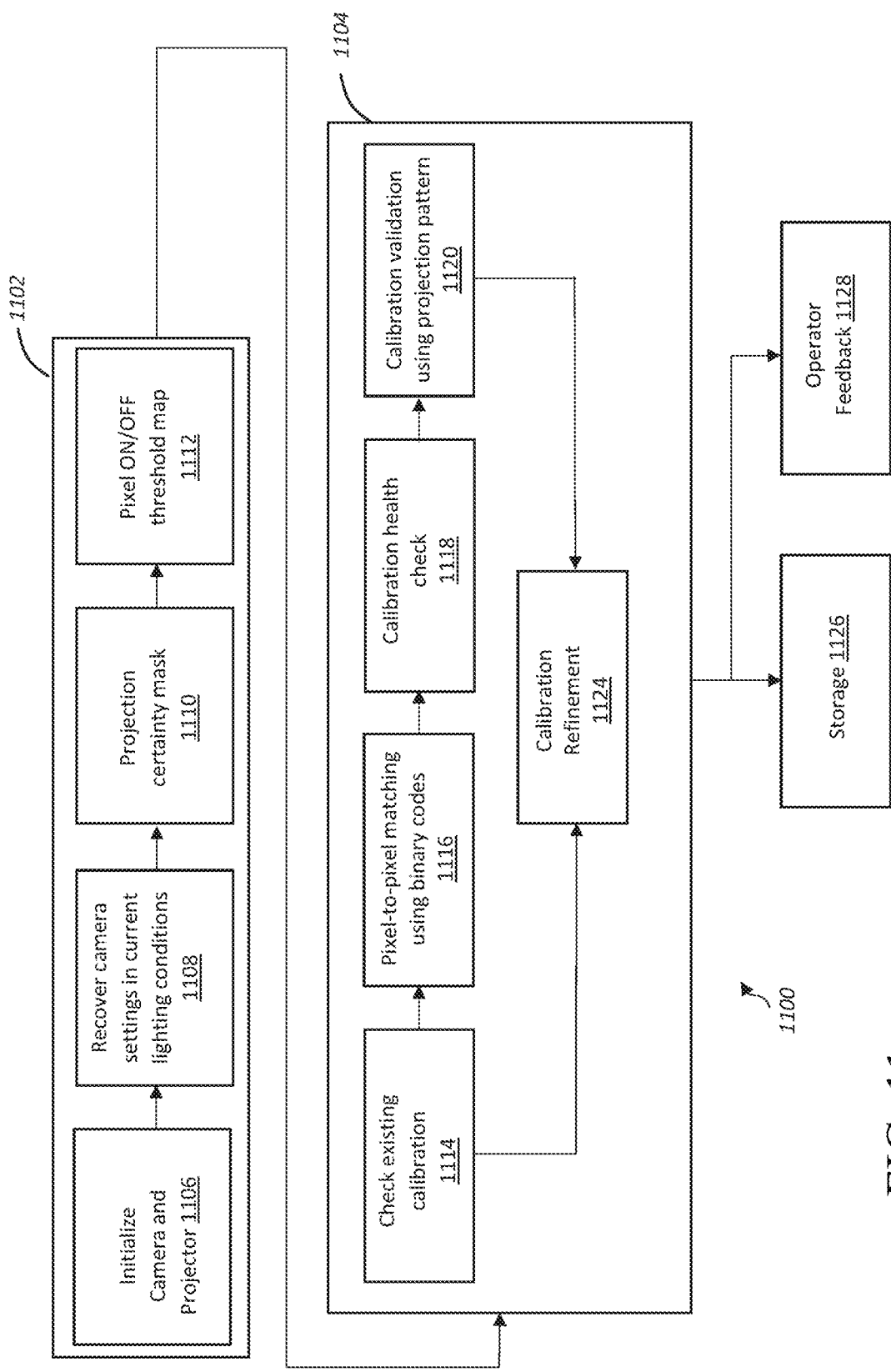
FIG. 11 depicts a flowchart of a method of deployment calibration in accordance with one embodiment.

Once at a location for use (e.g., a workspace) the apparatus may be turned on and perform the deployment auto-calibration method 1100 of FIG. 11. This method 1100 may be performed every time the apparatus 100 is started up to see, effectively, where the projection screen is. This method may be performed because the location of the projection screen can change whenever the apparatus 100 is moved. For example, the apparatus 100 may be moved between different workstations in which the work surfaces are at different distances from the apparatus. If no further calibration of the components with respect to each other is necessary, the apparatus 100 may be ready for use.

Similar to the method 300 of FIG. 3, the deployment auto-calibration method 1100 may include an initialization step 1102 and a calibration step 1104. The initialization step 1102 may include the sub-steps of initializing the camera and the projection device 1106 and recovering the sensor settings in the current lighting conditions 1108. Step 1108 may be similar to step 308 of FIG. 4, except that step 1108 is performed in current lighting conditions. This may be performed whenever the apparatus is turned on to ensure the calibration is still valid. For example, lighting conditions may change over a time period and may be different if the apparatus is moved between different locations.

The initialization step 1102 may also include the steps of calculating a projection certainty mask 1110 referring to how well the camera detects projection device pixels. As stated previously, this may be an iterative process in which different patterns are projected at varying brightness. Generally the score will improve as the projection device value (brightness) increases. These patterns may include a threshold map in which certain projection pixels are on and certain pixels are off as in step 1112.

In the calibration step 1104, the existing is calibration is checked in step 1114. If the existing calibration is incorrect or otherwise not acceptable, projection device pixels and camera pixels may be matched using binary codes (or any other type of code) in step 1116 to get the correlation between the camera and the projection device.

The apparatus 100 may perform a calibration health check in step 1116 and, similar to factory calibration, the projection device 106 may project a validation pattern in step 1120. This pattern may be the pattern 600 of FIG. 6 to ensure the camera is able to detect the corners 602, for example.

If necessary, any final calibration refinement techniques may be performed in step 1124, at which point information regarding the calibration may be sent to storage in step 1126 for later retrieval. Additionally, an operator may receive and/or provide feedback regarding the calibration in step 1128.

Given an existing calibration C s.t. $C(x_1)=x_2$, which correlates pixels in image 1 to pixels in image 2, the refinement process can be defined as the following optimization problem:

$$C = \arg\min_{\hat{C}} \|\hat{C}(X_1) - X_2\|_{L_2}$$

where $X_i$ are points in the ith image.

The iterative process may take a calibration hypothesis and find a set of corresponding points ⟨P, Q⟩ between projected pattern images and captured camera images, where P $\{q_0 \ldots, q_n\} \subset$ Q are camera-image points. A scoring function is computed as follows:

$$f(\langle P,Q \rangle | C) = \|C(P) - Q\|$$

However, point correspondence is not given. Therefore a point selection scheme may be defined as $$p_i = \{p_j \in \hat{P} | g(q_j \in \hat{Q}) < \tau\}$$

where $$g(q) = \begin{cases} d(q, C(p)) & q \text{ is at a known landmark} \\ b & \text{otherwise} \end{cases}$$

and b is a (large) constant, and $\tau$ is a threshold. The selection scheme may often have outliers. Therefore a robust voting method should be used to find hypothesized calibrations. Iterations continue while in iteration k+1, the following holds $$f(\langle P,Q \rangle | C_{k+1}) > f(\langle P,Q \rangle | C_k)$$

or while some other termination criteria are met.

Calibrations can occur during different states of the projection device and the sensor device. For example, the following events of (1) detection; (2) tracking; and (3) recognition may pertain to the situation where the sensor device is on and the projection device is off. This can occur when the projection device is in phase (e.g., from the method 700 of FIG. 7), but during the small fraction of the projection device's duty cycle when it is off. Or, this can occur when the projection device is deliberately turned off in a given temporal pattern (e.g., every other frame) or some other random pattern to reduce oscillating flicker or the like.

Regarding detection, the projection device may be off so that the sensor device(s) can more accurately and easily detect information regarding the environment. Projection devices, when on, often create artificial low-level constructs in the captured scene such as edges, shadows, occlusions, or the like. Thus, certain detection methods become obsolete or otherwise non-practical. Therefore, the projection device may be off so that the sensor device can more accurately detect fiducials, natural markers, certain objects, human operators, other information regarding the environment, or the like.

Regarding tracking, several existing algorithms assume that objects moving in a scene maintain their brightness between frames under constant lighting (i.e., Brightness Constancy). Projection devices, however, generally project patterns that counteract the ambient lighting, thereby making tracking based on visual traits non-practical. Therefore, the projection device may be off so that the sensor device can more accurately track object(s) within the scene.

Regarding recognition, it is common that computer vision techniques find objects in a scene based on certain visual features of the objects. Projection devices, however, generally project patterns that alter these visual features in unpredictable ways, thereby obstructing the operation of a trained visual classifier. Therefore, the projection device may be off so that the classifier can more accurately recognize certain objects.

In other applications, both the sensor device(s) and the projection device are on, but synchronized in their shutter. For example, the sensor device may start capturing information regarding the scene when the projection device starts projecting imagery, or the sensor device(s) may capture 3 frames for each of the projection device's red, green, and blue (RGB) channels. In one embodiment, the camera may capture: the R channel when the G and B channels are illuminated by the projection device; the G channel when the R and B channels are illuminated; and the B channel when the R and G channels are illuminated.

In structured-light reconstruction, for example, structured light uses specific lighting patterns of a projector-camera rig to reconstruct a 2.5D image of the geometry in the scene (e.g., see the calibration method 1100 of FIG. 11) A calibrated synchronized projection device and camera system can create a high-resolution scan much faster than non-synchronized rigs since the shutter is precisely aligned with the projection device's raster scan.

Figure 12:
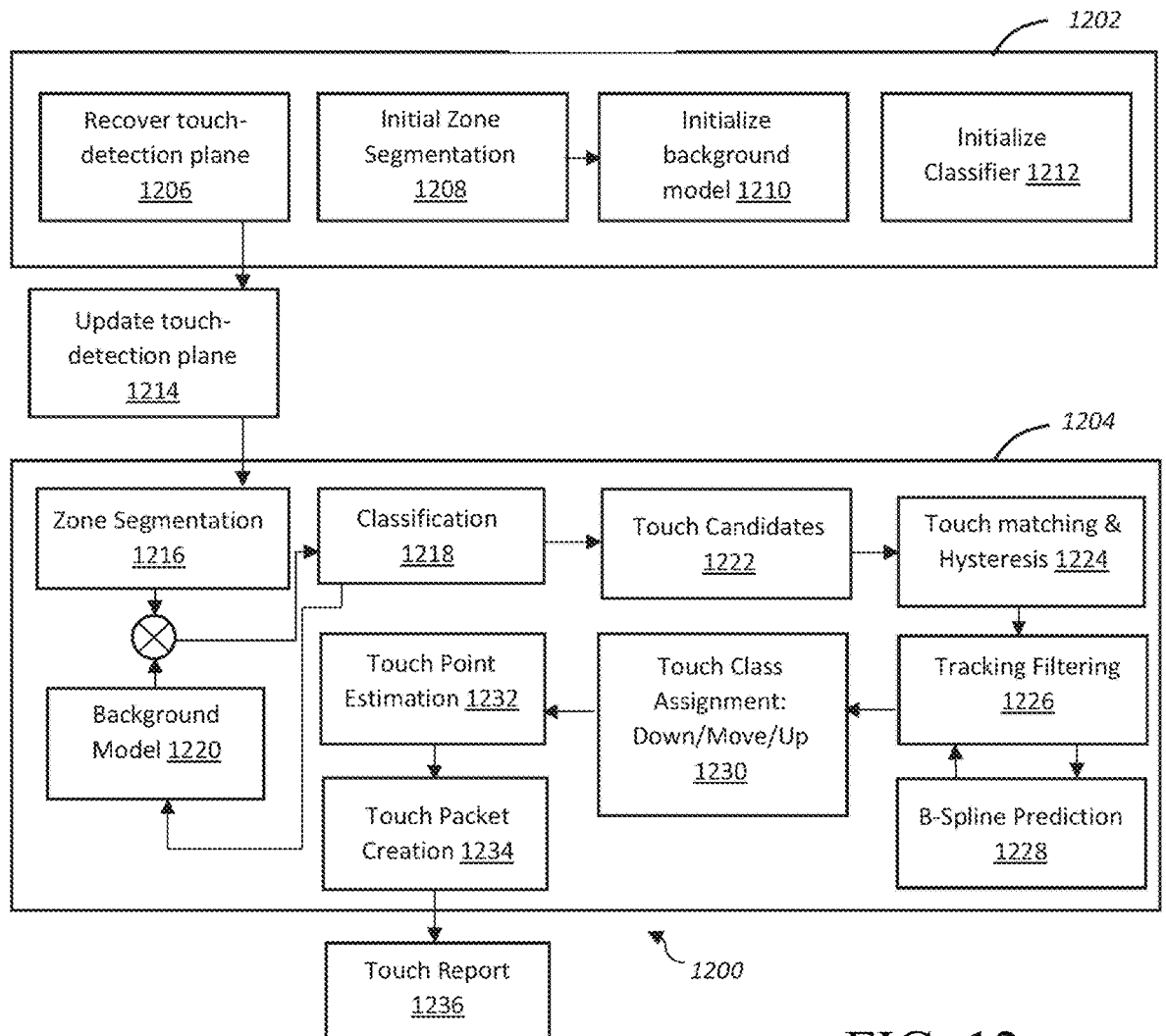
FIG. 12 depicts a flowchart of a method for robust touch detection in accordance with one embodiment.

The features of the present invention also enable robust ways to detect touch events between an operator and a workspace (and objects within the workspace). Detecting touch events may be used to recognize when an operator touches a surface of a workspace (e.g., to create an interface or to indicate some instruction) or other type of object. FIG. 12 depicts a flowchart of a method 1200 for performing robust touch detection in accordance with an embodiment.

Figure 13:
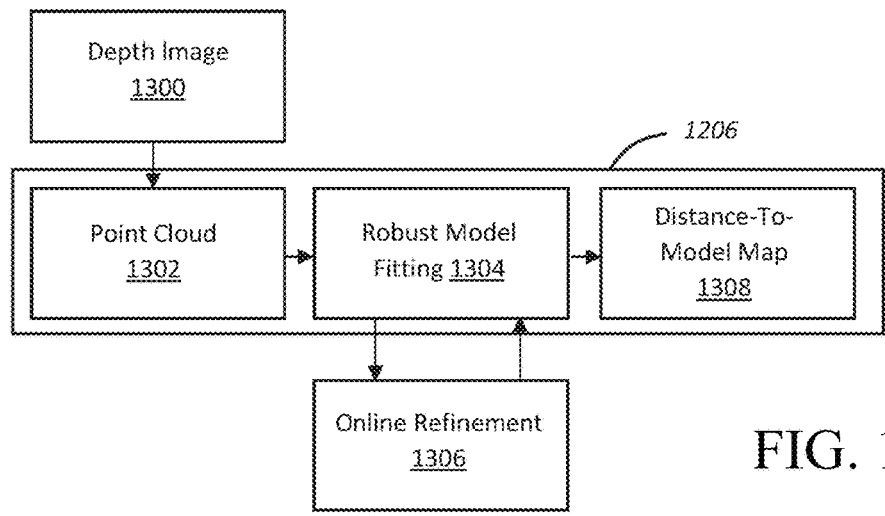
FIG. 13 depicts the touch-detection plane recovery step of the method of FIG. 12 in accordance with one embodiment.

Method 1200 may include two parts: initialization 1202 and runtime 1204. Step 1206 of initialization 1202 involves recovering a touch-detection plane. This step 1206 is depicted in more detail in FIG. 13.

A depth image of a workspace (e.g., the surface of a desk or a table) is captured in step 1300. This depth image may be captured by a depth sensor, for example. A point cloud 1302 is calculated in step 1302. A point cloud is essentially a representation consisting of a plurality of points that are located on the surface(s) of a workspace that can be seen by a depth sensor.

Figure 14:
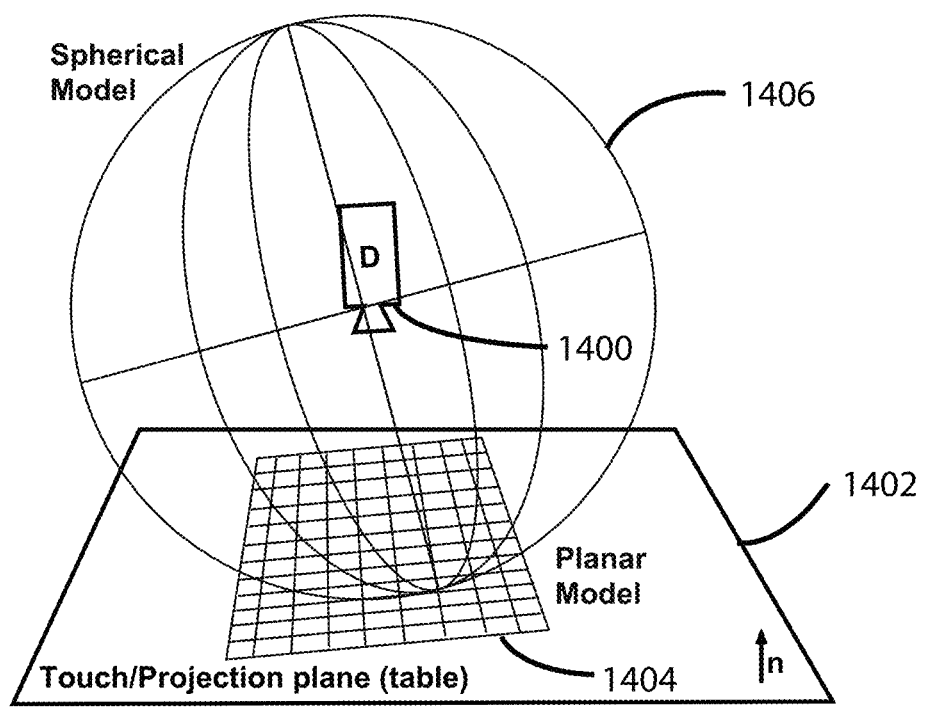
FIG. 14 depicts the robust model fitting step of the method of FIG. 13 in accordance with one embodiment.

In step 1304, at least one model corresponding to surfaces may be fitted through the points of the point cloud. This model fitting is illustrated in FIG. 14. As shown, a depth sensor 1400 is oriented towards a table 1402, and a model (or multiple models) corresponding to various "touchable" areas may be fitted with respect to the table 1402 (based on the point cloud of step 1302). The model(s) may be a planar model 1404 (i.e., flat), and/or the model may be a spherical model 1406, in which model corresponds to a small portion of the sphere. This model may be continuously refined in step 1306 to ensure a proper fit to the work surface(s). It is of course noted that a model or models may take the form of other shapes.

Regarding the models, the spherical model may be defined as follows: a point p=(x, y, z) lies on the sphere when it satisfies $\|p - S_c\|_{L2} = R$, where $S_c = (x_c, y_c, z_c)$ is the center of the sphere and R is the radius. This translates to $$(x-x_c)^2 + (y-y_c)^2 + (z-z_c)^2 = R^2$$

The planar model may be defined as follows: a point p=(x, y, z) lies on the plane when it satisfies $$ax^2+by^2+cz^2+d=0$$

where a, b, c, and d are the plane parameters.

Step 1308 involves creating a distance-to-model map. After the plane is calculated, a distance map can be created to determine the distance of objects from the surface. For example, this enables the apparatus to determine the distance between the plane and an operator's hands.

Figure 15:
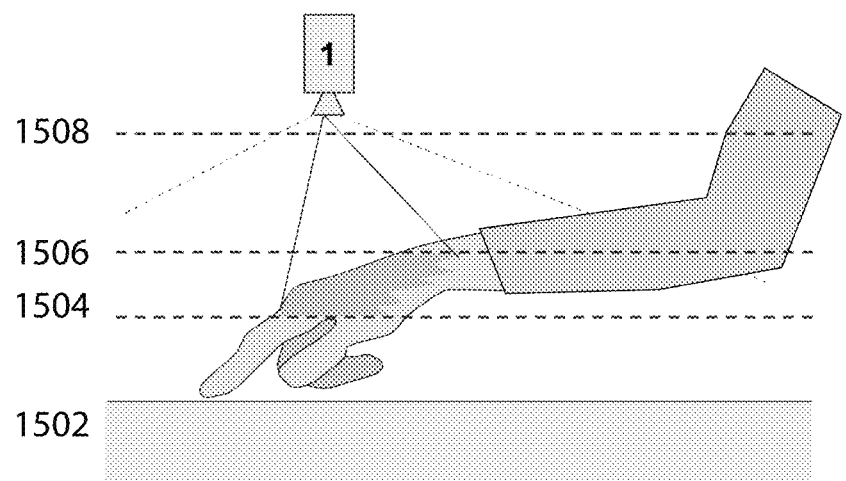
FIG. 15 illustrates the segmentation step of the method of FIG. 13 in accordance with one embodiment.

Referring back to FIG. 12, step 1208 involves segmentation which is the division of the region above the plane into certain layers. FIG. 15, for example, depicts the plane 1502, a low palm threshold 1504, a high palm threshold 1506, and an arm threshold 1508. Essentially these layers (or segments) or divided into regions in which certain portions of an operator (e.g., palm, hand, etc.) are likely to be located during operation.

Step 1210 involves initializing a background model which is a storage of objects that may be stored in the background of a workspace. In the context of this embodiment, the term "background" may refer to objects in a workspace that are not the operator (or a portion of the operator's body). Step 1212 involves initializing a classifier for classifying various objects within the workspace. Basically, this classifier may detect an operator's hands, arms, or other portions of the operator (referred to as the foreground) and everything else in the workspace (i.e., the background, which may include objects located in the workspace).

After initialization 1202, the touch-detection plane may be updated in step 1214. This occurs as a background process and may occur continuously to ensure an accurate touch-detection plane. These updates may be required in the event of any small movements of the projection device or table, for example. Also, in the event that the refinement fails (e.g., if the plane is unable to be found), the plane recovery method may start over.

The runtime step 1204 may occur in real time and may occur when an operator is performing some task at the workspace. In step 1216, the zone segments may be updated as a result of any updates to the touch-detection plane. The classifier may classify objects in the image as either foreground or background in step 1218. Items or objects classified as background objects may be designated as background objects in the background model in step 1220. That is, the background model serves as memory for objects within the workspace that are not classified as arms, hands, fingers, or the like.

This essentially provides a feedback loop based on the zone segmentation. For example, if there are no arms/hands detected in the workspace, all other detected items may be classified as background. Therefore, the background model may be constantly updated while reducing computation time.

Referring back to step 1218, the classifier may have knowledge of what typical arms, hands, and fingers look like. Therefore, an operator's arm, hand, or fingers may be quickly recognized as foreground (and therefore used to detect touch candidates).

Figure 16:
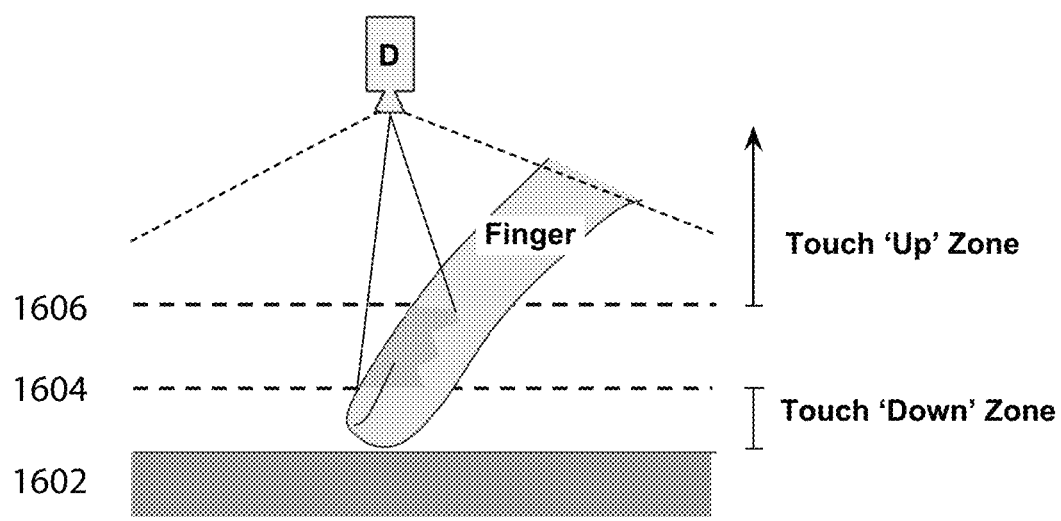
FIG. 16 illustrates various zones used for detecting touch events in accordance with one embodiment.

Step 1222 involves detecting touch candidates. In addition to the segmentation discussed previously, the region above the plane may be divided into "touch zones." FIG. 16, for example, illustrates the plane 1602 (such as the plane 1502 of FIG. 15), a low threshold 1604, and a high threshold 1606. The region between the plane 1602 and the low threshold 1604 may be referred to as the "touch down zone" and the region above the high threshold 1606 may be referred to as the "touch up zone."

Step 1224 involves touch matching and hysteresis based on the touch down zone and the touch up zone. For example, a touch event may occur when an operator's finger crosses into the touch down zone. Or, a touch event may occur only when an operator's finger crosses into the touch down zone and then crosses into the touch up zone.

The matching aspect of step 1226 detects whether there was a previous touch event at the same or similar location. For example, if there was a previous touch event (e.g., in the previous frame), a current touch event is likely a drag-based touch in which the operator may be dragging their finger across the workspace. If there were no previous touch events, then a current touch event is likely a new touch event.

Accordingly, method 1200 may also include a filtering step 1226. For example, an operator may inadvertently move their finger outside of the touch down zone even though they intended to perform a touch event. Or, there may be unwanted noise in measurements due to unwanted movement of a camera. Therefore, a filter (e.g., a Kalman filter) may be applied to filter out, for example, unwanted movement to ensure a touch event is accurately detected and/or stable.

Similarly, step 1228 involves predicting an operator's touch event based on how they are moving their finger (or other portion of their body). Additionally, based on the predictive interfacing feature (described in conjunction with FIG. 19), features of the present invention can also approach an operator approaching, as well as a motion vector of an arm, for example, and can predict a future interaction. Because of the matching step 1224, the apparatus may have information regarding the history of an operator's touch event. For example, the apparatus 100 may detect that an operator has been moving their finger in a certain motion, and a spline may be calculated based on the history of the operator's touch event. Based on the calculated spline, the apparatus can predict where the operator's finger is going (and with what velocity). For example, given a touch point history of the last three measurements $\{p_0, p_1, p_2\}$ where $p_i=(x_i, y_i)$, a quadratic B-spline calculation B(t) at time t can be defined as $$B(t) = (t^2 \ t \ 1) \begin{pmatrix} 1 & -2 & 1 \\ -2 & 2 & 0 \\ 1 & 0 & 0 \end{pmatrix} \begin{pmatrix} x_0 & y_0 \\ x_1 & y_1 \\ x_2 & y_2 \end{pmatrix} = (x_b, y_b)$$

This spline-calculation feature may be important in the event the operator inadvertently lifts their finger from the low threshold. In this situation, the apparatus 100 may nonetheless predict how the operator was going to continue their touch event. Additionally, this feature may be used to send a predicted location for a touch event to, for example, overcome any latency inherent in the system.

Step 1230 involves assigning a class to a touch event. The apparatus 100 may be configured to classify an operator's movement as a touch event only if the operator touches the plane (e.g., by entering the touch down zone) moves their finger within the touch down zone, and then lifts their finger into the touch up zone.

Touch point estimation then occurs in step 1232. This estimation is helpful because the depth sensor is unable to detect the precise location of where the touch occurs. That is, when an operator touches the surface, the depth sensor is only able to detect the top surface of the operator's hand/ finger. Therefore, the apparatus 100 may consider the locations of other portions of the operator (e.g., the center of the operator's hand or other finger(s)), as well as the size/width of the finger(s) to more accurately estimate the location of the touch event.

For example, given a touch contour T={$t_0, \ldots, t_n$}, $t_i \in \mathbb{R}^2$ and the location of the palm $p \in \mathbb{R}^2$, the touch point can be calculated as $\mathbb{R}$ $$\hat{t} = \underset{t_i \in T}{\arg\max} \ (t_i - \mu) \cdot c$$

where $$\mu = \frac{1}{n} \sum t_i \quad c = \frac{\mu - p}{\|\mu - p\|}$$

This point is the extreme point on the finger with respect to the palm and may correspond to the tip of the finger.

After the touch point is estimated, information regarding the touch event is packetized in step 1234 and may then be communicated to a user interface in the form of a touch report 1236. The touch event may be displayed on an interface to inform an operator their touch event has been detected.

Figure 17:
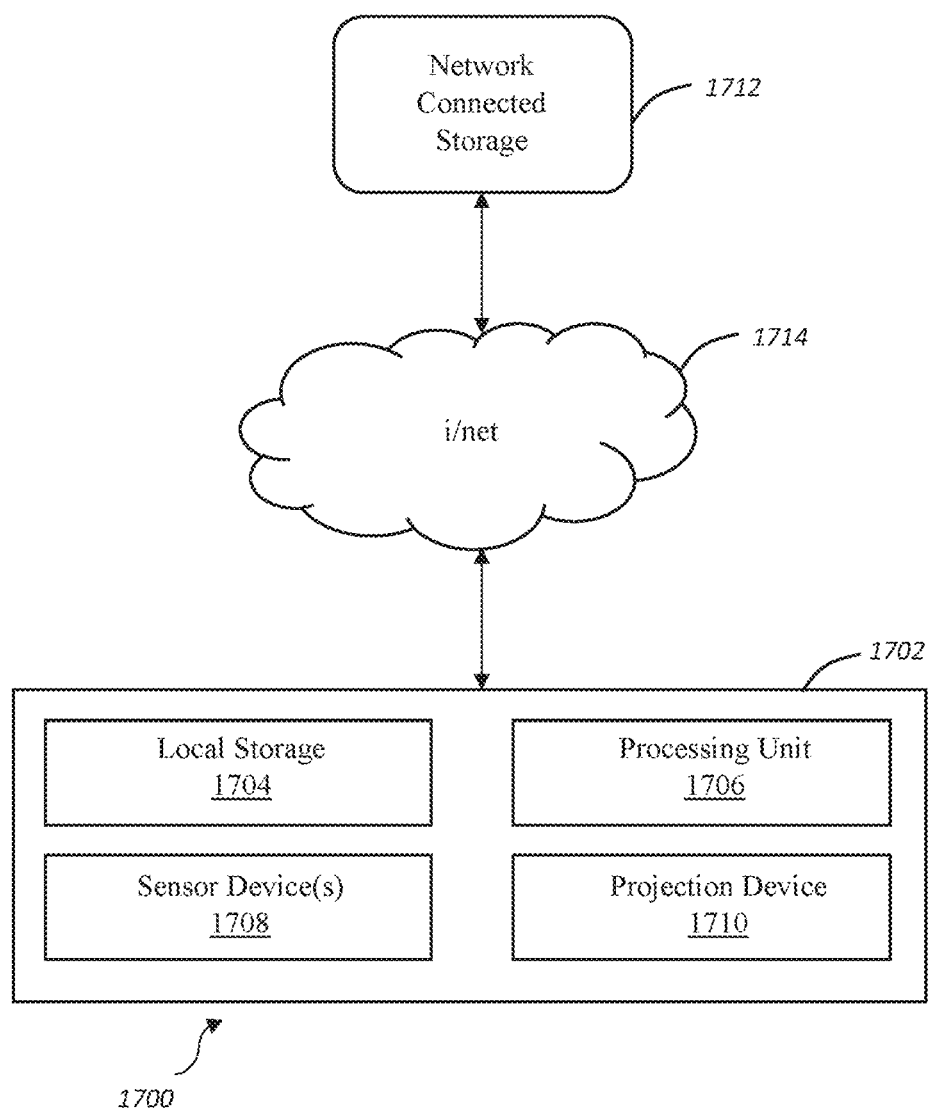
FIG. 17 depicts a cloud-local hybrid architecture in accordance with one embodiment.

Referring back to the classification step 1218 of FIG. 12, objects may be classified using a combination of a cloud-based storage and a local storage. FIG. 17 depicts the system architecture 1700 of this cloud-local hybrid approach. The projection-sensor apparatus 1702 may include a local storage 1704, a processing unit 1206, sensor device(s) 1708, and a projection device 1710. The apparatus 1702 may be in communication with a network-connected storage 1712 via an internet connection 1714. This is essentially a hybrid configuration and enables more efficient object detection and recognition. More specifically, the network-connected storage allows access to additional samples (of objects) to improve the detection or to provide additional computer vision-related capabilities. For some tasks, a certain degree of latency (due to round-trip delays) may be acceptable. For detection, an object may be presented to the system and the object's "finger print" can be obtained to detect the object with, for example, a two-second latency (this latency may be acceptable for the detection phase). Then, once detected, the local storage 704 can track the object in real time.

There may be several objects that may be located in a workspace or otherwise in view of the sensor device(s) 1708 (i.e., background objects). These objects may include, for example, speakers, pens, pencils, markers, tools, machinery, and office supplies. This list is non-exhaustive and several other types of objects may be present. When gathering information regarding a user and their interactions with the environment, it may be desirable to know the types of objects the user is or isn't interacting with. Additionally, once an object is detected, the object may be used in the authoring process to add object-based functionality to processes. This feature allows for a novel digital-physical interface.

The network-connected storage 1712 may therefore store a library of objects to assist in object detection. When the sensor device(s) 1708 detect an object, local components may query offline server devices (not shown) to search the network connected storage 1712 for initial candidates (e.g., of what the detect object may be). These stored initial candidates may be models generated by computer aided drawing (CAD) applications, for example, and may be particularly useful in distinguishing between an operator and other objects in the environment. These initial candidates may then be shipped to the local storage 1704, at which point the candidates will be searched further for detection and tracking.

Sending candidates to the local storage 1704 reduces the search space and therefore produces more viable results by speeding up the identification process. This may allow the hardware and other processing components to have a smaller memory footprint and use less processing power. Although the system 1700 of FIG. 17 is described as being implemented in the touch classification step of FIG. 12, it may be used for other purposes. For example, it may be used for more general applications such as object detection and tracking.

Figure 18:
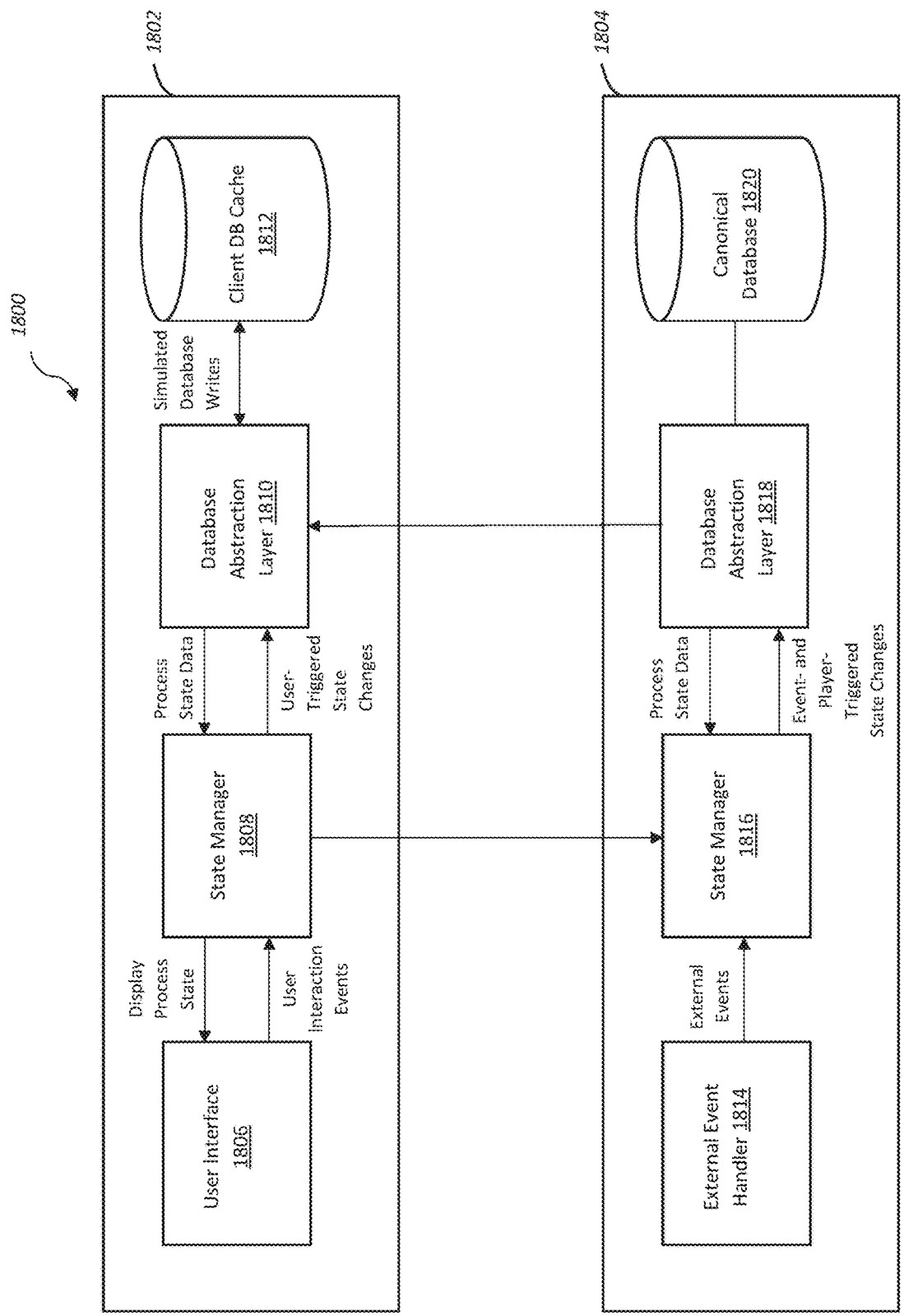
FIG. 18 illustrates synchronization between a machine and a server in accordance with one embodiment.

FIG. 18 illustrates the system architecture 1800 of a machine 1802 (e.g., a tablet or other type of interface used by a user to, for example, design and edit interfaces or procedures) synchronized with a server 1804 (e.g., on- or off-premise). The machine 1802 may include a user interface 1806 for allowing a user (operator) to view and input information regarding a procedure, for example, a state manager 1808, a database abstraction layer 1810, and a client database cache. The server 1804 may include an external event handler 1814, a state manager 1816, a database abstraction layer 1818, and a canonical database 1820.

User interaction events are communicated from the user interface 1806 to a state manager 1808. The state managers 1808 and 1816 run both client-side in the machine 1802 and on the server 1804. While logic shared between the two state managers 1808 and 1816, the server-side state manager 1816 may run in a trusted environment and can update the canonical database 1820.

To produce zero-latency interaction the machine 1802, the system 1800 needs to be able to respond to user interaction without waiting for a round-trip to the server 1804. By running the same state manager and database abstraction layer on top of the client-side database cache, the machine 1802 can simulate the database write on the client-side and show the updated process state immediately while the server's state manager 1816 performs the same logic to update the canonical database 1820.

In this way, latency compensation is achieved by simulated writes client-side, while still ensuring that the canonical database 1820 is only updated by the trusted state manager 1816 running on the server 1804. The database abstraction layer 1818 also handles merging updates from the server 1804 with the client-side database cache 1812. These updates can be caused by external events sent to the server 1804, or because the server-side state manager 1816 performed a different action from the client-side state manager 1808. Data from the server 18014 may take precedence over simulated actions made by the client.

Figure 19A:
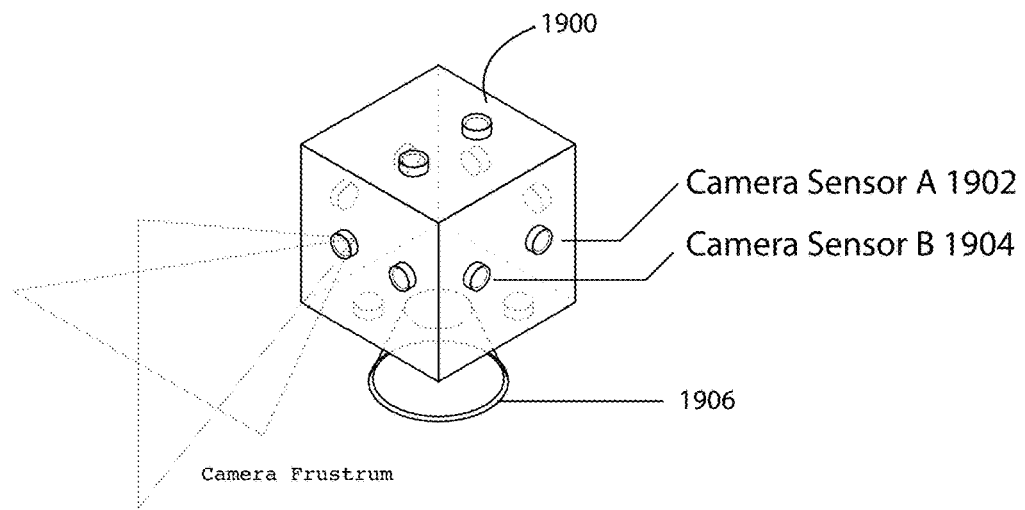
FIGS. 19A and B illustrate a projector and sensor apparatus in accordance with another embodiment.
Figure 19B:
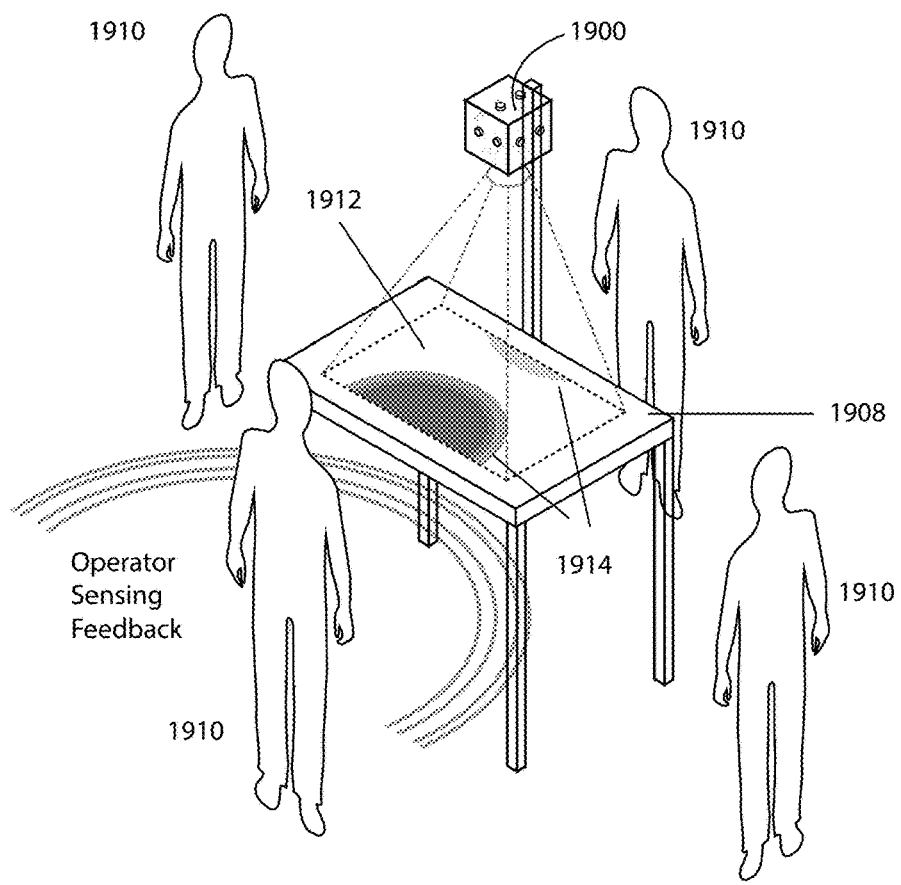

FIGS. 19A and 19B illustrate an exemplary configuration of an apparatus 1900 in accordance with one embodiment. In this embodiment, the apparatus 1900 may include a plurality of camera sensors A 1902 and B 1904 that are oriented in various directions, as well as a projection device 1906. Other sensor devices may be used that are external to the apparatus 1900.

FIG. 19B illustrates the apparatus 1900 located in a workspace above a table 1908. As shown, at least one of the camera sensors 1902 and 1904 may be oriented and configured to detect operators 1910 at the workspace. Similarly, the camera sensors 1902 and 1904 may also detect when an operator is approaching/leaving a workspace.

The projection device 1906 may project imagery onto the table 1908 to assist the operator(s) 1910 in performing some task. Additionally, the projection device 1906 may project an "operator approaching indicator" 1914 when the sensor devices 1902 and 1904 detect that an operator 1910 is approaching the table 1908.

Other camera sensor devices 1902 and 1904 may be configured to detect the operators' arms/hands/fingers, etc. within the workspace. These sensors may detect touch-events between the operator(s) 1910 and the table 1908, gestures made by the operator(s) 1910, interactions between the operator(s) 1910 and other objects in the workspace, and interactions between two or more operators 1910.

By detecting when an operator 1910 is approaching the workspace and/or the operator's movements within the workspace, features of the invention may also project imagery to assist the operator based on predictions obtained from their movement. For example, in one embodiment, when the sensor 1902 or 1904 detects an operator (or multiple operators) approaching a workspace, the projection device 1906 may project imagery to highlight (e.g., with shadows) a certain object or location that is likely going to be used by the operator(s) 1910.

Similarly, if an operator 1910 reaches for an object, the projection device 1906 may project imagery highlighting the object. Or, if the operator 1910 is reaching for an incorrect object (e.g., while assembling a product, following a recipe, etc.), the projection device 1906 may project imagery highlighting an object that the operator 1910 should use instead.

As yet another example, if an operator 1910 is using a tool device (e.g., a hand-held power drill), the camera sensors A 1902 and B 1904 may detect how the operator 1910 is holding the tool device. If the operator 1910 is holding the tool device incorrectly, the projection device 1906 may project imagery instructing the operator 1910 regarding how to correctly hold/operate the tool device. The above list of the types of imagery that may be projected based on detected operator movements is non-exhaustive and other types of predictive imagery may be projected without departing from the scope of the invention.

As mentioned previously, features of the present invention may also recognize certain gestures made by the user with respect to the work surface, workpiece, and/or the projected imagery. A gesture may represent in instruction to change the projected imagery, to select an option associated with the projected imagery, select a portion of a workpiece for analysis or further processing, or the like.

Figure 20A:
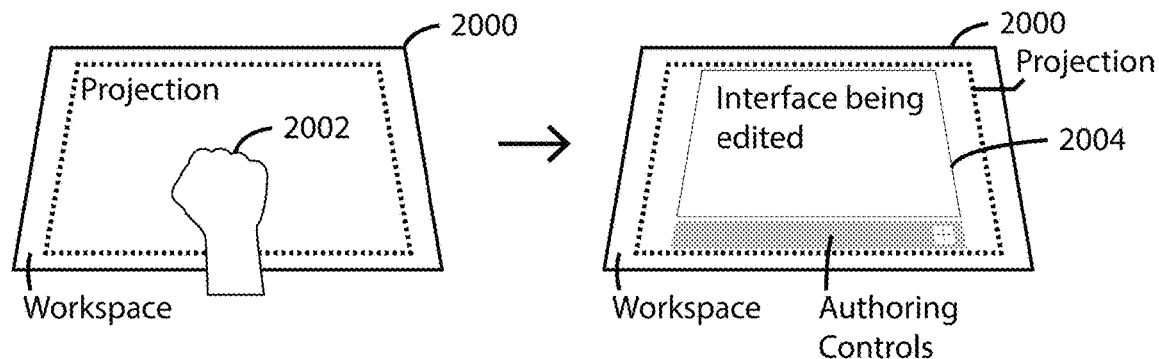
FIGS. 20A-O illustrate several types of operator gestures that may be detected in accordance with various embodiments of the invention.

FIG. 20A, for example, illustrates a work surface 2000 and an operator 2002 (i.e., an operator's fist). In this embodiment, the operator 2002 may make a gesture (by making a fist) over the work surface (and in view of the apparatus 100, not shown) to enter "authoring mode." After this (non-touch) gesture is detected, the projection device 106 may project a blank canvas 2004 so the operator 2002 can design some process, create an interface, or the like, while in the authoring mode.

Figure 20B:
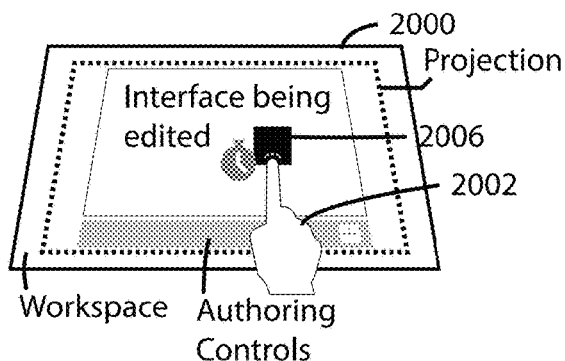
Figure 20C:
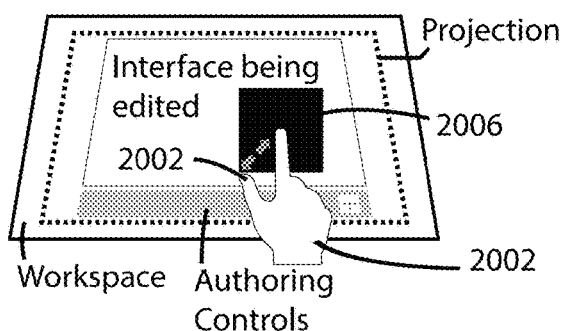
Figure 20D:
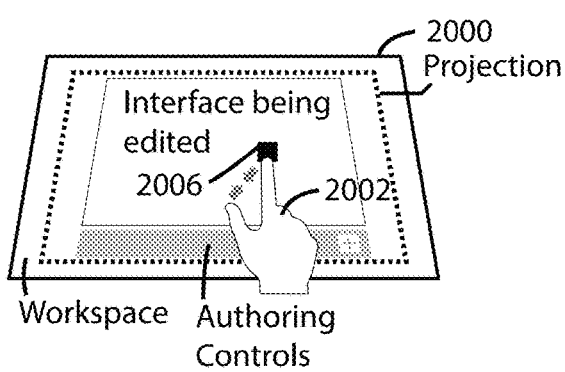

FIG. 20B, for example, illustrates the operator 2002 touching the work surface for a predetermined time (e.g., 2 seconds). When this touch event is detected, the projection device may project an object 2006 in the form of a square. This square may be used as a button in an interface, for example. FIG. 20C shows the operator making a "scale-up" gesture by spreading their index finger and their thumb. This gesture may be interpreted as an instruction to increase the size of the object 2006, and the projection device may project imagery reflecting this instruction (i.e., by enlarging the size of the projected object 2006).

Similarly, FIG. 20C illustrates the operator 2002 making a "scale-down" gesture by bringing their thumb and index finger closer together. This gesture may be interpreted as an instruction to decrease the size of the object 2006, and the projection device may projection imagery reflecting this instruction (i.e., by decreasing the size of the object 2006).

Figure 20E:
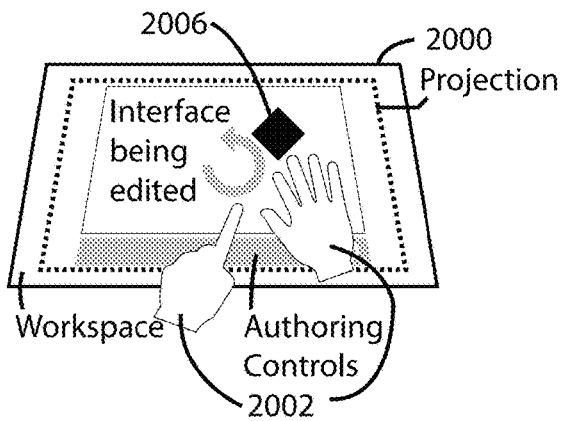

FIG. 20E illustrates another touch-based gesture in which the operator 2002 uses two hands to make a "rotate" gesture. For example, the operator 2002 may use their left hand to create a point that the object 2006 rotates around. The operator 2002 may then open their right hand to initiate the rotation about the left hand point.

Figure 20F:
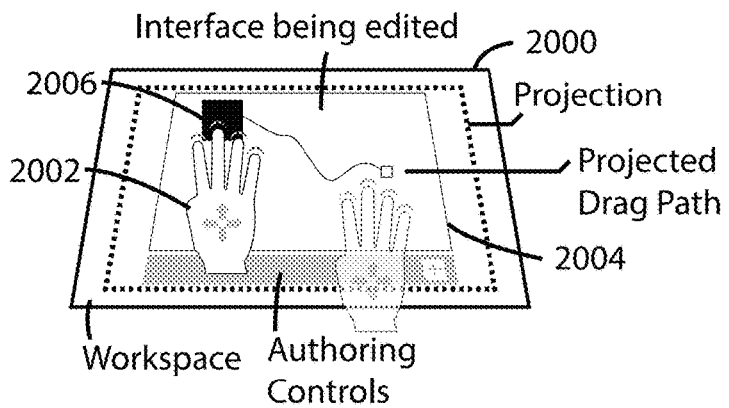

FIG. 20F illustrates yet another touch-based gesture in which the operator 2002 may translate the object 2006 across the canvas 2004. The operator 2002 may, for example, touch the object 2006, and drag their finger across the canvas 2004 to a different location.

Figure 20G:
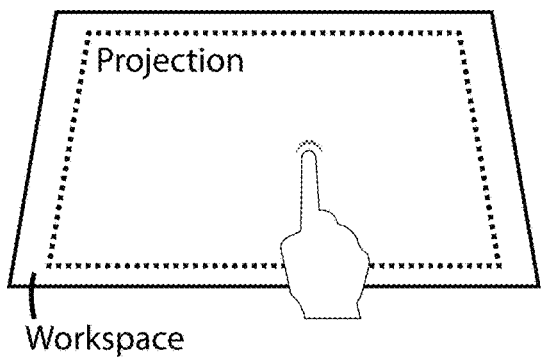
Figure 20H:
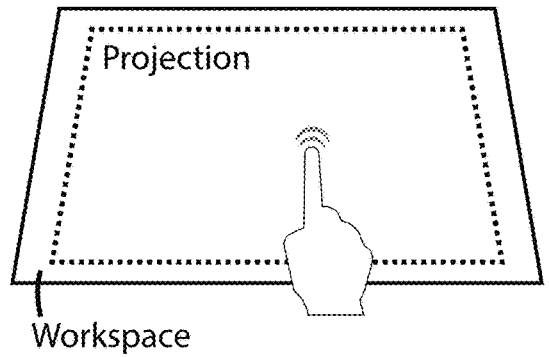
Figure 20I:
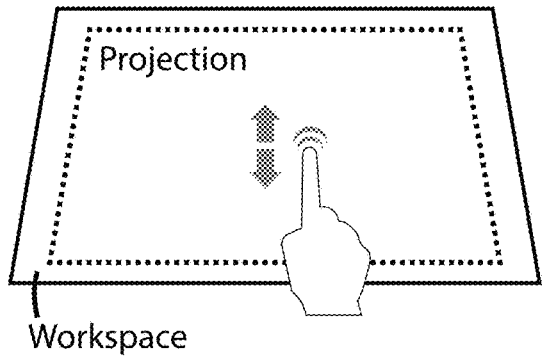
Figure 20J:
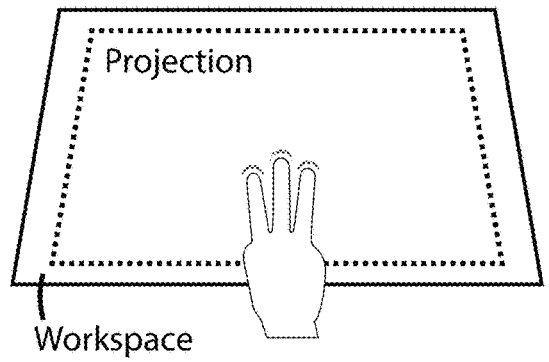

FIGS. 20G-J illustrate gestures used for navigation. These gestures may be used to, for example, navigate through various interfaces similar to navigating through a web browser. These may include point touch as illustrated in FIG. 20G, double touch as illustrated in FIG. 20H, scrolling as illustrated in FIG. 20I, and three-finger touch as illustrated in FIG. 20J. The type of gesture made, along with its meaning, may of course vary and depend on the embodiment.

Figure 20K:
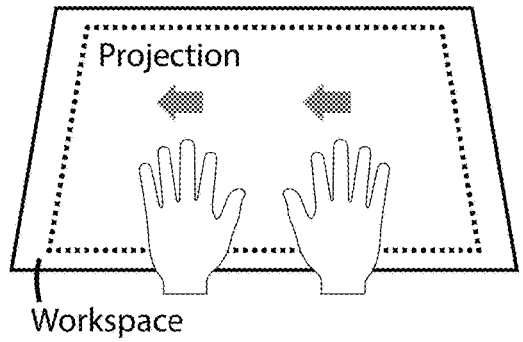
Figure 20L:
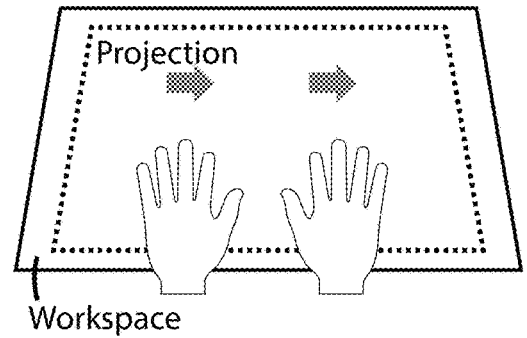
Figure 20M:
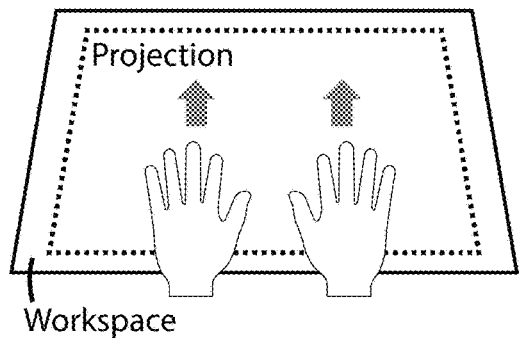
Figure 20N:
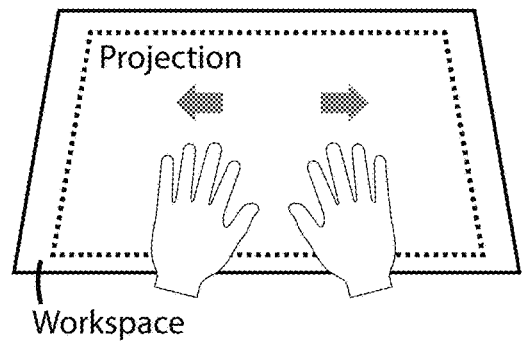
Figure 20O:
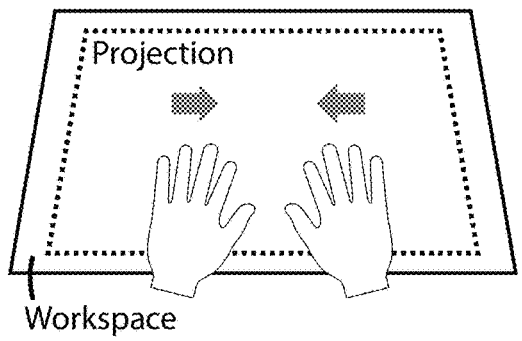

These navigation-based gestures may also include air (i.e., non-touch gestures). These gestures may include "move to next step" as illustrated in FIG. 20K, "move to previous step" as illustrated in FIG. 20L, "show menu" as illustrated in FIG. 20M, "zoom in" as illustrated in FIG. 20N, and "zoom out" as illustrated in FIG. 20O. The above list of gestures is non-exhaustive and other types of gestures may be made without departing from the features of the invention.

Figure 21:
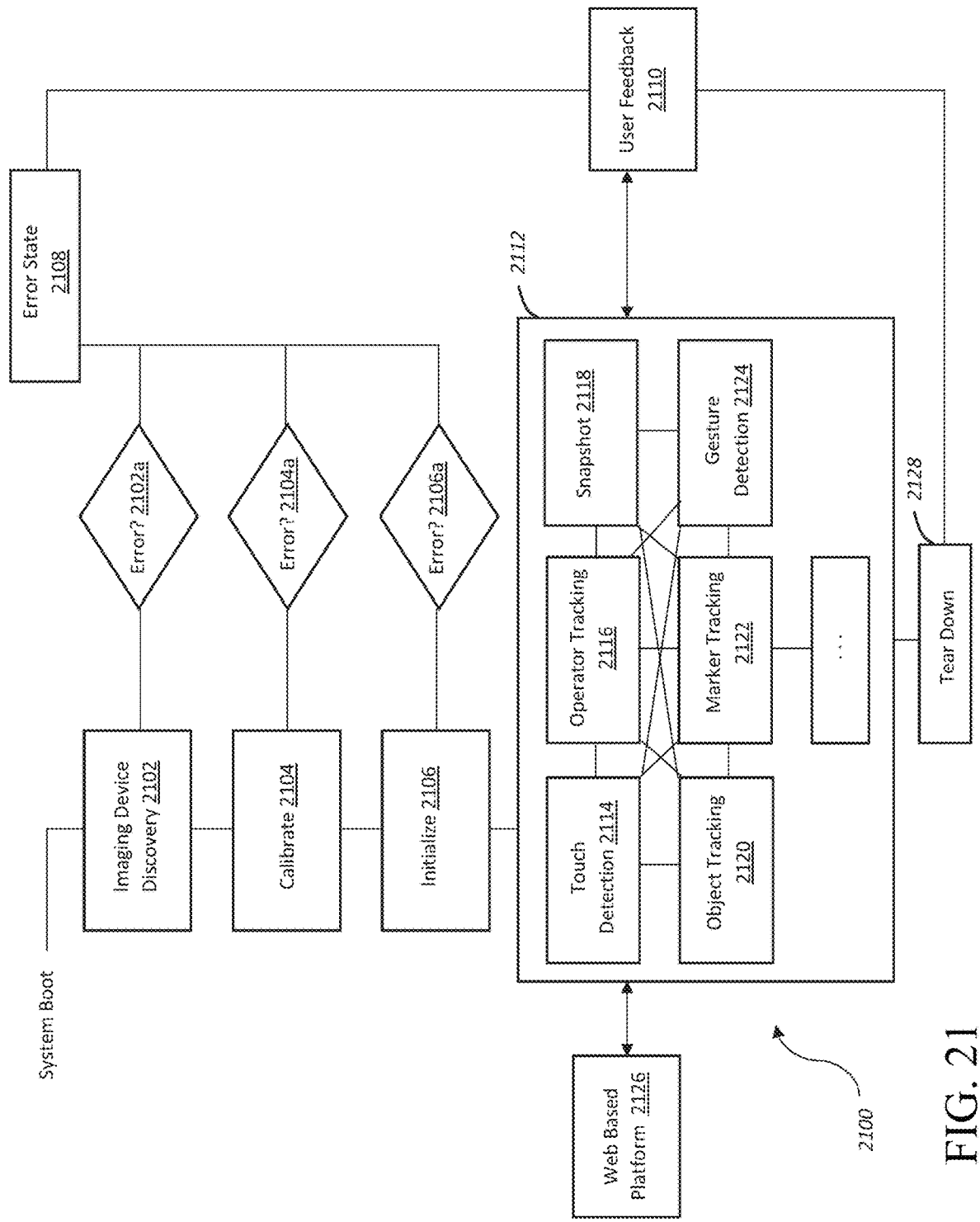
FIG. 21 illustrates the overall software system architecture and flow in accordance with one embodiment.

Having described the various components and process of the present invention, FIG. 21 presents the overall software system architecture and flow 2100 in accordance with one embodiment. Upon system boot, discovery of any various imaging devices (e.g., sensor devices) occurs in 2102. Then, any applicable hardware devices are calibrated in 2104. These calibrations may include calibrations of the sensor devices and projection devices according to the various methods described previously. Then any applicable devices may be initialized in 2106 (e.g., to determine optimal settings of the devices based on their surrounding environment. It is also noted that each step 2102, 2104, and 2106 may be associated with an error check step 2102a, 2104a, and 2106a, respectively. Any detected errors may be communicated to an error state module 2108 and communicated to a user in 2110. The user may then take any appropriate steps to remedy the error(s).

After the discovery, calibration, and initialization steps, various modules 2112 may be ran to accomplish the various features of the invention. These may include a touch detection module 2114, an operator tracking module 2116, a snapshot module 2118 (e.g., to record certain information at a certain point in time), an object tracking module 2120, a marker tracking module 2122, and a gesture detection module 2124. This gesture detection module 2124 may not only detect gestures made by the operator, but it may also learn and be readily updated with new gestures made by an operator.

These modules may be in communication with a web-based platform 2126 such as the one illustrated in FIG. 18. This platform 2126 may enable communication with an on- or off-premise platform, among other features, may enable a consistent interface across platforms while also taking advantage of unique hardware capabilities of the machine on which it is running. This web-based platform 2126 may provide a consistent set of APIs to applications that abstract away from platform-specific implementation details. For example, the platform 2126 may automatically select the appropriate backend for each module based on the specific capabilities provided by both the native platform and the backed software running on the machine.

As mentioned previously the system 2100 may obtain and provide feedback to a user in 2110. This feedback may be provided to an operator in a variety of ways including, but not limited to, visual-based feedback, haptic-based feedback, auditory-based feedback, or any combination thereof. At the end of a procedure, for example, the components of the system at a station may be taken down and removed in step 2128.

FIGS. 22A-E illustrate an exemplary interface authoring in accordance with one embodiment. Similar to FIGS. 20A-O, this interface-authoring may include a workspace 2200 on which an operator 2202 has entered authoring mode to create an interface on a canvas 2204.

Figure 22A:
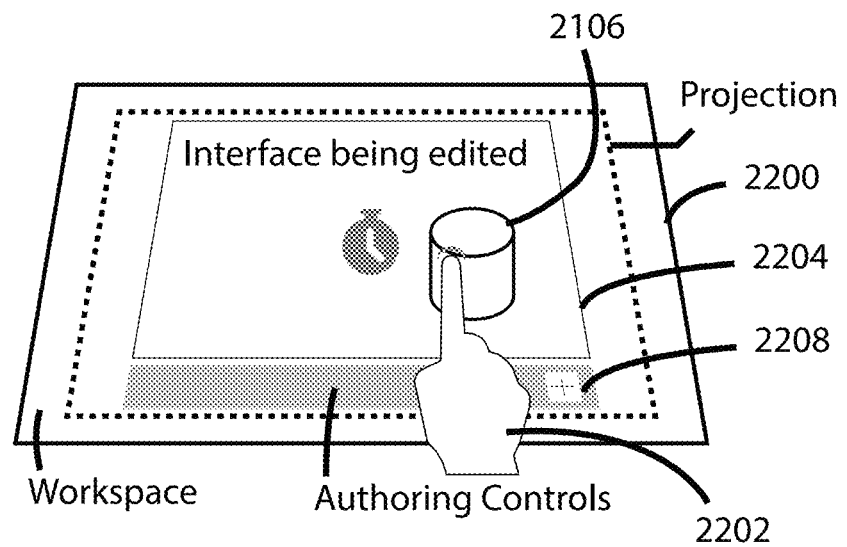
FIGS. 22A-E illustrate steps of an exemplary interface authoring process in accordance with one embodiment.

FIG. 22A illustrates the operator 2202 making a touch-based gesture by touching, with their index finger, a portion of the canvas 2204 to create an object 2206 (illustrated as a cylinder). In this embodiment, there projection device may also project an authoring control panel 2208, including a plurality of widgets, shapes, or other types of objects that may be used to author an interface.

Figure 22B:
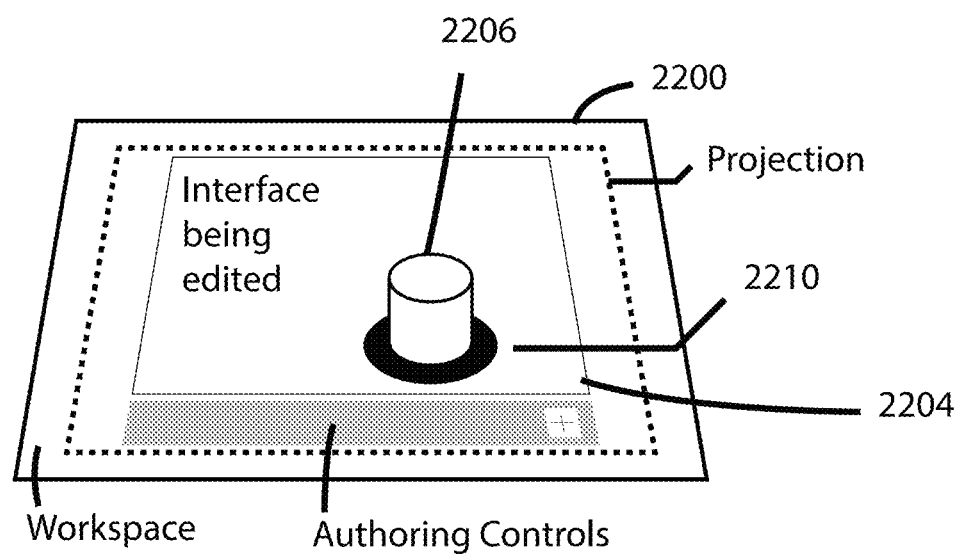
Figure 22C:
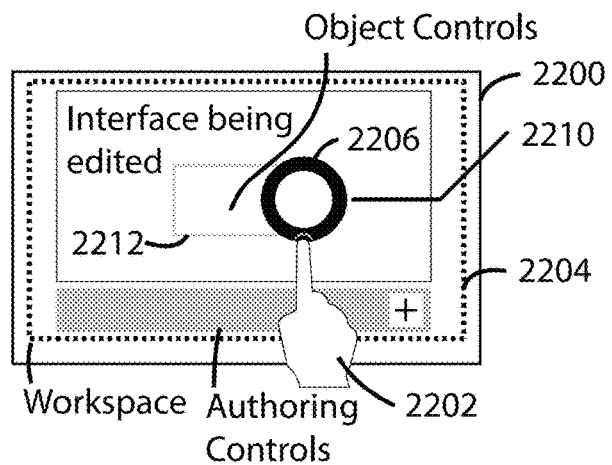

FIG. 22B illustrates a selection indicator 2210 corresponding to the object 2206. This may inform an operator that this particular object 2206 has been selected (e.g., based on a detected touch event). FIG. 22C illustrates a top view of the workspace 2200 and the selection indicator 2210 of FIG. 22B. There may be an object controls window 2212 that is projected in the vicinity of the selection indicator to present a series of controls. These controls may include, but are not limited to, linking the object 2206 to another object or other interface elements, annotating, capturing a photo of the object 2206, and scanning the object 2206 using the sensor devices.

Figure 22D:
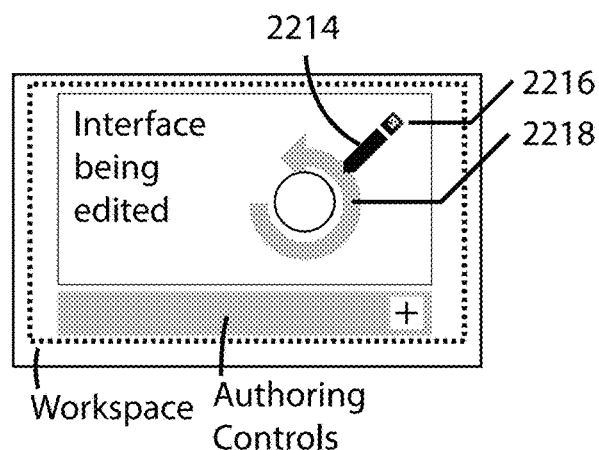

If an object is unable to be detected, an operator may use a stylus device to, for example, manually teach the particular object to the system. FIG. 22D illustrates a stylus 2214 with a marker 2216 (for detection by the sensor device(s)) that is creating an outline 2218 around the object 2206. Therefore, an operator can essentially teach the system about certain items or objects within the workspace.

Figure 22E:
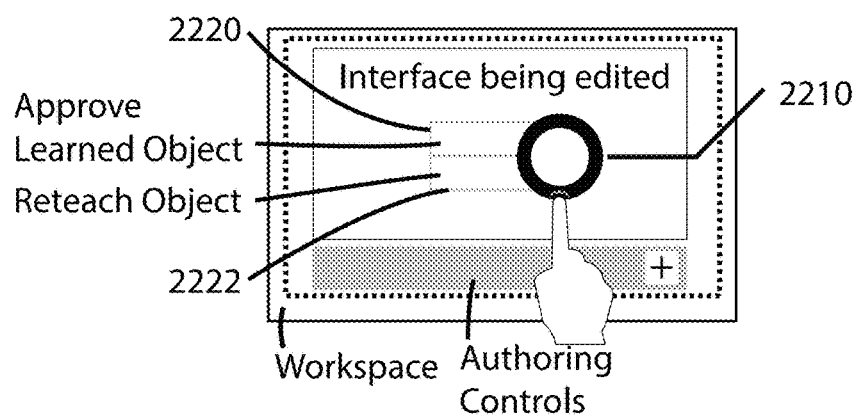

After the operator identifies a particular object, the operator may be presented with certain textual windows for further instruction. FIG. 22E, for example, presents windows 2220 and 2222 instructing the operator to either approve the learned object or to reteach the object to the system, respectively.

Certain portions of the canvas may be designated as "no-fly zones" in which an operator's gestures are not given any meaning. Similarly, certain portions of the canvas may include objects that are "locked" from being touched or otherwise interacted with by an operator.

An operator may also indirectly design interfaces through a tablet or other type of interface. For example, an operator may be located at a workstation with a tablet, and may design an interface on their table. As they are designing the interface, the projection device at the workspace may project imagery in real time corresponding to the design steps taken by the operator on the tablet.

Figure 23A:
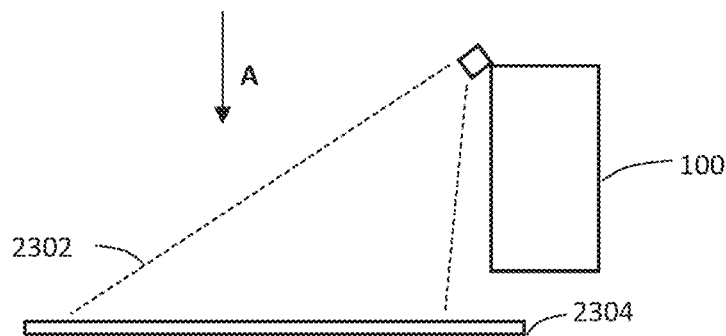
FIGS. 23A-G illustrate the individual steps of a method for facilitating manufacturing in accordance with one embodiment.

FIGS. 23A-G illustrate another example of how the projector-sensor apparatus 100 may be used. FIG. 23A shows the projector-sensor apparatus 100 projecting a light pattern 2302 (here imagery) onto a work surface 2304 such as a table or desk.

Figure 23B:
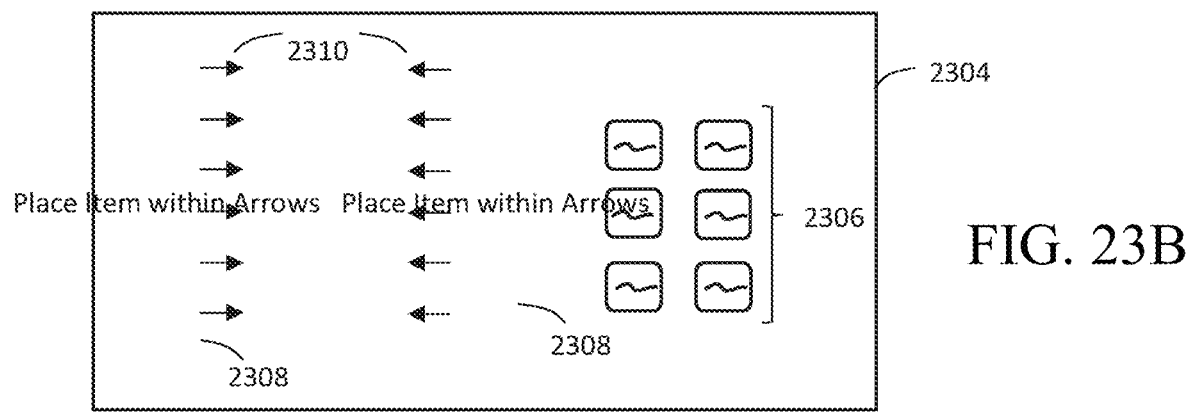

FIG. 23B shows a view of the work surface 2304 taken along the view of arrow A of FIG. 23A. FIG. 23B shows imagery projected by the projection device 2300 on the work surface 2304. The imagery may include an interface 2306 in the form of projected, augmented-reality "buttons," textual information 2308 for instructing a user, and indicia 2310 in the form of arrows, for example. This type of interface may have been authored by an operator implementing any of the methods/gestures described above. This list of imagery components is merely exemplary, and the type of imagery projected by the projector-sensor apparatus 100 may depend on the embodiment and process.

In this embodiment, the projector-sensor apparatus 100 may be used to assist in a material-handling process. These types of material-handling process include, but are not limited to, marking, painting, cutting, layering, measuring, fabricating, or any other type of process or operation that may use a light-based template that can benefit from direct touch manipulation that allows an operator (or operators) to interact directly with a workpiece. In FIGS. 23B-G, the projector-sensor apparatus 100 may, for example, label defects in an article identified by a trained operator, and then present the locations of the defects to another operator who is tasked to cut or otherwise remove the defects.

Figure 23C:
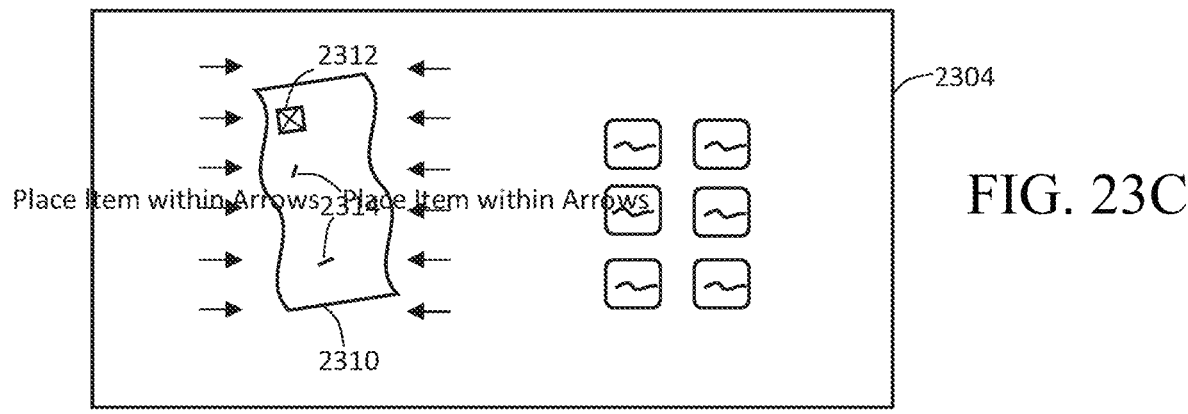

FIG. 23C also shows the view of the work surface 2304 taken along the view of arrow A of FIG. 23A. FIG. 23C also shows an article 2310 such as a piece of cloth (e.g., hide) that includes a fiducial marker 2312. The fiducial marker may be in the form of a barcode, a QR code, or other type of label that can be detected by at least one sensor device of the projector-sensor apparatus 100.

Figure 23D:
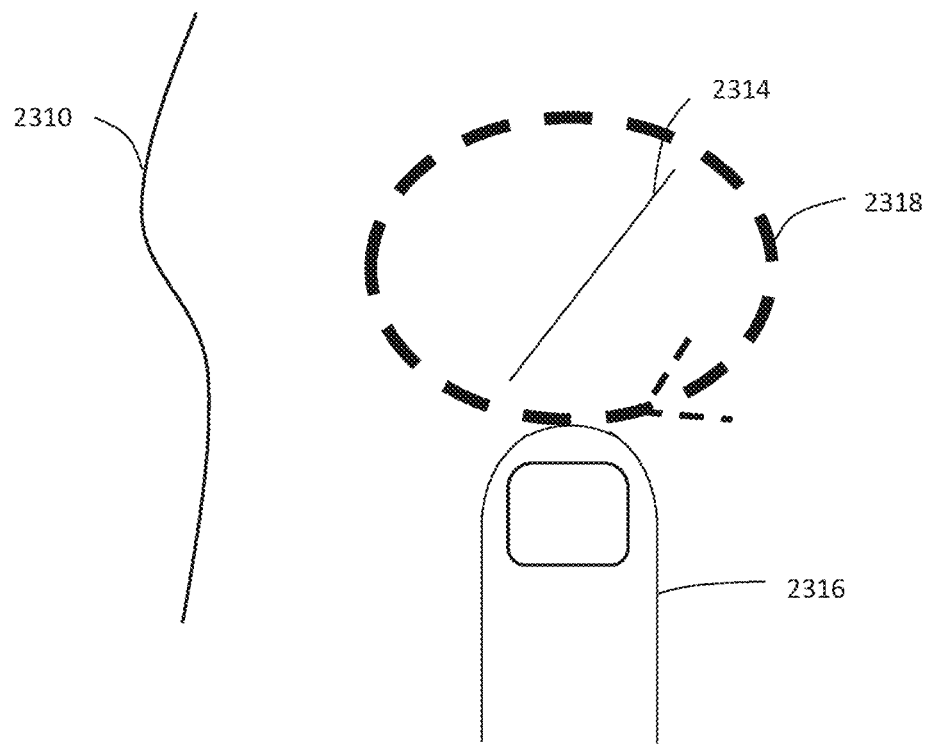
Figure 23E:
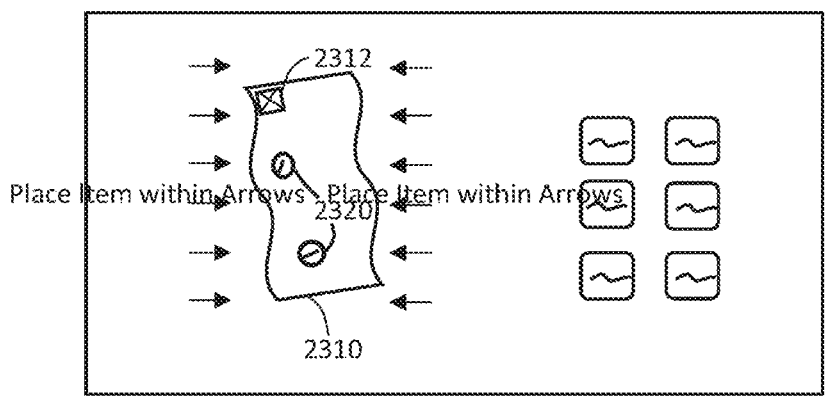

A trained operator may be tasked to, for example, inspect the article 2310 for defects 2314 before the article 2310 is cut or otherwise used to manufacture a product. To identify the defect 2314, the operator may make a gesture (e.g., with their hand or body), in view of the projector-sensor apparatus 100, to indicate the location of the defect(s) 2314. As seen in FIG. 23D, for example, the operator may move their finger 2316 in a circular motion 2322 around the defect 2314. The at least one sensor device 110 may detect the operator making this motion, and the processing unit 112 may recognize this motion as a "defect identification" gesture.

This circular motion illustrated in FIG. 23D is exemplary and is merely one of several types of gestures that may be made by an operator and recognized by the processing unit 112. Other types of gestures such as those made with more than one finger may similarly be made and used to represent some instruction.

The location of where the gestures were made (and therefore the locations of the defects 2314) may be communicated to the processing unit 112, and in turn to the projection device 106. The projection device 106 may then project imagery identifying the defects 2314 to assure the operator that the defects have been identified correctly. For example, two defects have been identified in FIG. 23E, and the projection device 106 may project light patterns in the form of circles 2312 that identify the defects based on the user's gestures.

Figure 23F:
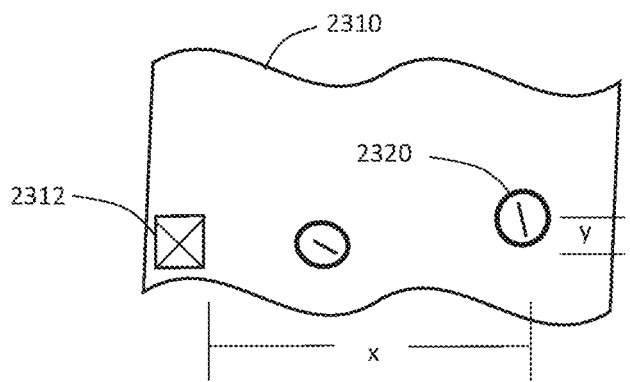

The locations of these defects 2314 with respect to the fiducial 2312 may be stored for further processing. FIG. 23F, for example, shows the location of one of the defects (as determined by the indicia 2320 with respect to the fiducial. Although the distance from fiducial 2312 is defined in Cartesian coordinates, other coordinate systems such as polar coordinates and spherical coordinates may be used to measure and record the location of the indicia 2320 with respect to the fiducial 2312. The distance of the article 2310 from the projector-sensor apparatus 100 (e.g., in the "z" direction) may also be considered.

Figure 23G:
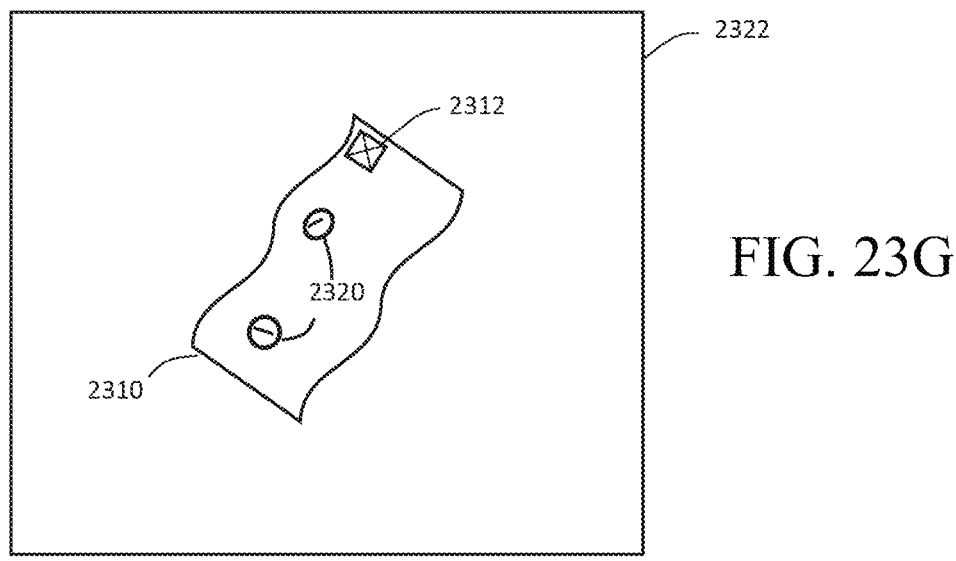

FIG. 23G presents a second workspace 2322 such as another desk or table. Although not shown, this workspace may also include a projector-sensor apparatus 100 such as the one illustrated in FIG. 23A. A second operator may be located at this workspace 2322 and may be tasked to cut or otherwise remove the defects 2314 from the article 2310.

Once the article 2310 is placed on the workspace 2322, the projector-sensor apparatus 100 may detect the fiducial 2212 and therefore recognize this particular article 2310. The projector-sensor apparatus 100 may then project imagery in the form of indicia 2320 (just as in FIG. 22E) to identify the defects. The locations of the indicia 2320 may be based on the location of the fiducial 2312 and the distances of the defects 2314 from the fiducial 2312 as determined in FIG. 23F.

With the defects 2314 properly identified, the second operator may then cut or otherwise remove the defects 2314 from the article 2310. Even as the operators move (e.g., rotate, translate) the article 2310 on the work space, the indicia 2320 may move accordingly with respect to the fiducial 2312 to continue to highlight the defects 2314.

For example, and as illustrated in FIGS. 23B-G, a first operator highlighted defects in the article 2310. The locations of these highlighted defects was stored. When the second operator placed the article 2310 on a work surface, the portions highlighted by the first operator may automatically became highlighted based on the location of the fiducial marker.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value may be equivalent to a statement that the value meets or exceeds a second threshold value that is slightly greater or slightly lower than the first threshold value, e.g., the second threshold value being one value higher (or lower) than the first threshold value in the resolution of a relevant system. A statement that a value is less than (or is within) a first threshold value may be equivalent to a statement that the value is less than or equal to a second threshold value that is slightly lower or greater than the first threshold value, e.g., the second threshold value being one value lower (or greater) than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

The invention claimed is:

1. A projector-sensor system for authoring an augmented reality application interface that guides at least one second operator through a guided procedure, the projector-sensor system comprising:
   at least one projection device configured to project imagery in a physical workspace;
   at least one sensing device configured to detect at least one first operator's movement in the physical workspace, and to scan an object in the physical workspace; and
   at least one processor configured to:
     determine that the projector-sensor system is unable to identify a first object placed in the physical workspace;
     detect a first interaction based on the at least one sensing device detecting a stylus tracing an outline around the first object placed in the physical workspace, the first interaction indicating that the first object in the physical workspace is an instance of an object type to be identified;
     present windows instructing the operator to either approve the learned object type or to reteach the object type to the projector-sensor system;
     receive an input from the operator approving the learned object type;
     recognize a second interaction detected from the at least one first operator maintaining a touch input with the physical workspace for a predetermined time as a command to create an interactive interface element, and create the interactive interface element responsive to the recognizing the command;

recognize one or more third interactions, including one or more of: the operator spreading or pinching two fingers to enlarge or reduce the size of the interactive interface element, the operator using two hands to make a rotate gesture for rotating the interactive interface element, or the operating dragging the interactive interface element to change the position of the interactive interface element;

recognize a fourth interaction based on the at least one sensing device detecting movement of the operator's hands in the same direction without touching the physical workspace;

responsive to recognizing the fourth interaction, associate the output of the commands issued responsive to the first interaction, the second interaction, and the one or more third interactions with a first task in the guided procedure, and create a second task in the guided procedure with which to associate additional interface elements, one or more additional objects placed in the workspace, or any combination thereof;

cause a second projector-sensor system to present an augmented reality application interface for each task in the guided procedure, cause the second projector-sensor system to direct the at least one second operator to manipulate a second object of the identified object type in a selected manner; and cause the second projector-sensor system to recognize a movement of the at least one second operator as an interaction with the interactive interface element.

2. The projector-sensor system of claim 1, wherein the stylus comprises a marker configured to be sensed by the at least one sensing device of the first projector-sensor system.

3. The projector-sensor system of claim 1, wherein the at least one processor is configured to:

in response to detecting a fifth interaction, initiate an action with respect to the first object.

4. The projector-sensor system of claim 3, wherein the action is selected from a group consisting of:

linking an interface object to another interface element in the augmented reality application interface specification, wherein the interface object corresponds to the first object in the physical workspace;

annotating, in the augmented reality application interface specification, the interface object corresponding to the first object in the physical workspace;

capturing a representation of the first object in the physical workspace; and using the at least one sensing device of the first projector-sensor system to scan the first object in the physical workspace.

5. The projector-sensor system of claim 1, wherein:

the at least one first operator's movement in the physical workspace comprises an in-air gesture made by the at least one first operator over a work surface in the physical workspace; and the at least one processor is configured to analyze data received from the at least one sensing device to detect the in-air gesture made by the at least one first operator.

6. The projector-sensor system of claim 5, wherein the at least one processor is configured to recognize the in-air gesture made by the at least one first operator as a command to enter an authoring mode.

7. A method for authoring an augmented reality application interface that guides at least one second operator through a guided procedure, the method comprising:

instructing at least one projection device to project imagery in a physical workspace;

using at least one sensing device to detect at least one first operator's movement in the physical workspace, and to scan an object in the physical workspace; and using at least one processor to:

determine that a projector-sensor system is unable to identify a first object placed in the physical workspace;

detect a first interaction based on the at least one sensing device detecting a stylus tracing an outline around the first object placed in the physical workspace, the first interaction indicating that the first object in the physical workspace is an instance of an object type to be identified;

present windows instructing the operator to either approve the learned object type or to reteach the object type to the projector-sensor system;

receive an input from the operator approving the learned object type;

recognize a second interaction detected from the at least one first operator maintaining a touch input with the physical workspace for a predetermined time as a command to create an interactive interface element, and create the interactive interface element responsive to the recognizing the command;

recognize one or more third interactions, including one or more of: the operator spreading or pinching two fingers to enlarge or reduce the size of the interactive interface element, the operator using two hands to make a rotate gesture for rotating the interactive interface element, or the operating dragging the interactive interface element to change the position of the interactive interface element;

recognize a fourth interaction based on the at least one sensing device detecting movement of the operator's hands in the same direction without touching the physical workspace;

responsive to recognizing the fourth interaction, associate the output of the commands issued responsive to the first interaction, the second interaction, and the one or more third interactions with a first task in the guided procedure, and create a second task in the guided procedure with which to associate additional interface elements, one or more additional objects placed in the workspace, or any combination thereof;

cause a second projector-sensor system to present an augmented reality application interface for each task in the guided procedure, cause the second projector-sensor system to direct the at least one second operator to manipulate a second object of the identified object type in a selected manner; and cause the second projector-sensor system to recognize a movement of the at least one second operator as an interaction with the interactive interface element.

8. At least one computer-readable storage medium having encoded thereon executable instructions that, when executed by at least one processor, cause the at least one processor to perform a method for authoring an augmented reality application interface used to assist in a material-handling process, the method comprising acts of:

instructing at least one projection device to project imagery in a physical workspace;

using at least one sensing device to detect at least one first operator's movement in the physical workspace, and to scan an object in the physical workspace; and using at least one processor to:
  determine that a projector-sensor system is unable to identify a first object placed in the physical workspace;
  detect a first interaction based on the at least one sensing device detecting a stylus tracing an outline around the first object placed in the physical workspace, the first interaction indicating that the first object in the physical workspace is an instance of an object type to be identified;
  present windows instructing the operator to either approve the learned object type or to reteach the object type to the projector-sensor system;
  receive an input from the operator approving the learned object type;
  recognize a second interaction detected from the at least one first operator maintaining a touch input with the physical workspace for a predetermined time as a command to create an interactive interface element, and create the interactive interface element responsive to the recognizing the command;
  recognize one or more third interactions, including one or more of: the operator spreading or pinching two fingers to enlarge or reduce the size of the interactive interface element, the operator using two hands to make a rotate gesture for rotating the interactive interface element, or the operating dragging the interactive interface element to change the position of the interactive interface element;
  recognize a fourth interaction based on the at least one sensing device detecting movement of the operator's hands in the same direction without touching the physical workspace;
  responsive to recognizing the fourth interaction, associate the output of the commands issued responsive to the first interaction, the second interaction, and the one or more third interactions with a first task in a guided procedure, and create a second task in the guided procedure with which to associate additional interface elements, one or more additional objects placed in the workspace, or any combination thereof;
  cause a second projector-sensor system to present an augmented reality application interface for each task in the guided procedure,
  cause the second projector-sensor system to direct at least one second operator to manipulate a second object of the identified object type in a selected manner; and
  cause the second projector-sensor system to recognize a movement of the at least one second operator as an interaction with the interactive interface element.

* * * * *